US008533998B2

(12) United States Patent
Nishikibe et al.

(10) Patent No.: US 8,533,998 B2

(45) Date of Patent: Sep. 17, 2013

(54) APPARATUS FOR CONTROLLING OPENING-AND-CLOSING MEMBER FOR VEHICLE

(75) Inventors: Takeshi Nishikibe, Anjo (JP); Noriyuki Kamiya, Chita-gun (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 302 days.

(21) Appl. No.: 12/833,338

(22) Filed: Jul. 9, 2010

(65) Prior Publication Data

US 2011/0016794 A1 Jan. 27, 2011

(30) Foreign Application Priority Data

Jul. 24, 2009 (JP) ................................ 2009-173293

(51) Int. Cl.
*B60J 5/04* (2006.01)
*E05F 11/54* (2006.01)
*E05F 15/02* (2006.01)

(52) U.S. Cl.
USPC ........................................................... 49/280

(58) Field of Classification Search
USPC .......... 49/279, 280, 360; 296/155; 292/201, 292/216; 318/264–266, 272, 277, 282, 286, 318/466–469
See application file for complete search history.

(56) References Cited

U.S. PATENT DOCUMENTS

| | | | | |
|---|---|---|---|---|
| 5,534,846 | A * | 7/1996 | Kuroda | 340/426.28 |
| 5,632,120 | A * | 5/1997 | Shigematsu et al. | 49/449 |
| 5,638,307 | A * | 6/1997 | Kamimura et al. | 713/321 |
| 5,938,251 | A * | 8/1999 | Watanabe | 292/201 |
| 6,089,649 | A * | 7/2000 | Hamada et al. | 296/155 |
| 6,091,162 | A * | 7/2000 | Williams et al. | 307/10.1 |
| 6,131,337 | A * | 10/2000 | Machida | 49/280 |
| 6,135,513 | A * | 10/2000 | Hamada et al. | 292/201 |
| 6,223,468 | B1 * | 5/2001 | Kobayashi | 49/280 |

(Continued)

FOREIGN PATENT DOCUMENTS

| | | | |
|---|---|---|---|
| JP | 2002-250163 | * | 9/2002 |
| JP | 2002-250163 | A | 9/2002 |
| JP | 2006-009485 | | 1/2006 |

OTHER PUBLICATIONS

Office Action issued on Apr. 30, 2013 by Japan Patent Office in corresponding Japanese Patent Application No. 2009-173293, and English translation thereof.

*Primary Examiner* — Katherine Mitchell
*Assistant Examiner* — Justin Rephann
(74) *Attorney, Agent, or Firm* — Buchanan Ingersoll & Rooney PC

(57) ABSTRACT

An apparatus for controlling an opening-and-closing member for a vehicle includes: a latch mechanism; a driving lever; a neutral position detecting portion detecting that the driving lever is in a predetermined neutral position; and a controlling portion performing a close movement, a release movement, and a returning movement after the close movement or the release movement, the controlling portion including a stress relaxing portion executing a driving of the driving lever in a reverse direction toward the neutral position after the close movement in a case of a detection failure, a prohibiting portion executing a prohibition of the driving of the driving lever after the driving of the driving lever in the reverse direction, and a cancelling portion cancelling the prohibition of the driving of the driving lever in a case where the number of times of the detection failures is less than a predetermined plural number of times.

14 Claims, 8 Drawing Sheets

(56) References Cited

U.S. PATENT DOCUMENTS

| | | | | |
|---|---|---|---|---|
| 6,499,776 | B2 * | 12/2002 | Takamura | 292/201 |
| 6,542,071 | B1 * | 4/2003 | Ohtsubo et al. | 340/426.28 |
| 6,669,247 | B2 * | 12/2003 | Swan | 292/201 |
| 6,698,804 | B2 * | 3/2004 | Shiota et al. | 292/201 |
| 6,717,290 | B2 * | 4/2004 | Hirota et al. | 307/10.2 |
| 6,888,335 | B2 * | 5/2005 | Sato et al. | 318/652 |
| 6,964,438 | B2 * | 11/2005 | Koike et al. | 292/201 |
| 6,974,165 | B2 * | 12/2005 | Koike et al. | 292/216 |
| 7,261,336 | B2 * | 8/2007 | Zillert | 292/201 |
| 7,360,337 | B2 * | 4/2008 | Yoneyama | 49/281 |
| 7,445,258 | B2 * | 11/2008 | Rice et al. | 292/341.16 |
| 7,552,952 | B2 * | 6/2009 | Roesslinger | 292/201 |
| 7,581,767 | B2 * | 9/2009 | Fujihara | 292/201 |
| 7,735,883 | B2 * | 6/2010 | Inoue et al. | 292/216 |
| 7,859,203 | B2 * | 12/2010 | Miyashita | 318/266 |
| 7,928,678 | B2 * | 4/2011 | Imai et al. | 318/468 |
| 2002/0021010 | A1 * | 2/2002 | Hirota et al. | 292/201 |
| 2003/0067175 | A1 * | 4/2003 | Shiota et al. | 292/201 |
| 2004/0227356 | A1 * | 11/2004 | Koike et al. | 292/216 |
| 2005/0127685 | A1 * | 6/2005 | Spurr et al. | 292/201 |
| 2005/0167991 | A1 * | 8/2005 | Yoneyama | 292/201 |
| 2005/0218663 | A1 * | 10/2005 | Schupp et al. | 292/216 |
| 2006/0168891 | A1 * | 8/2006 | Aoyama et al. | 49/360 |
| 2006/0242908 | A1 * | 11/2006 | McKinney | 49/280 |
| 2006/0282694 | A1 * | 12/2006 | Ichikawa | 713/322 |
| 2009/0151257 | A1 * | 6/2009 | Dominique | 49/280 |
| 2009/0165386 | A1 * | 7/2009 | Suzuki et al. | 49/282 |
| 2010/0064588 | A1 * | 3/2010 | Jitsuishi et al. | 49/358 |
| 2010/0270815 | A1 * | 10/2010 | Shinoda et al. | 292/201 |
| 2011/0167730 | A1 * | 7/2011 | Itami et al. | 49/279 |

* cited by examiner

APPARATUS FOR CONTROLLING OPENING-AND-CLOSING MEMBER FOR VEHICLE

CROSS REFERENCE TO RELATED APPLICATIONS

This application is based on and claims priority under 35 U.S.C. §119 to Japanese Patent Application 2009-173293, filed on Jul. 24, 2009, the entire content of which is incorporated herein by reference.

TECHNICAL FIELD

This disclosure relates to an apparatus for controlling an opening-and-closing member for a vehicle.

BACKGROUND DISCUSSION

An apparatus for controlling an opening-and-closing member for a vehicle is disclosed in JP2002-250163A. According to JP2002-250163A, after a vehicle door, serving as the opening-and-closing member, is switched to a half-closed state during a closing movement of the vehicle door, a motor unit is driven so as to pivot a movement gear, which has been in a neutral position, toward a door-fully-closing side, thereby holding the vehicle door in a fully-closed state (a close movement). Subsequently, the movement gear is returned to the neutral position. Further, after a signal for requesting an opening movement of the vehicle door is detected in response to an operation of a button and the like by a user, the motor unit is driven so as to pivot the movement gear, which has been in the neutral position, toward a door full-close releasing side, thereby releasing the holding of the vehicle door by means of the latch mechanism (a release movement). Subsequently, the movement gear is returned to the neutral position. Further, a state where the movement gear is in the neutral position is detected on the basis of a detection signal (switching of ON-OFF state) of a neutral switch.

When the state where the movement gear is in the neutral position is not detected, after the close movement, due to an abnormal performance of the neutral switch, a program shifts to an abnormal movement mode, and a stress relaxing movement is performed. Subsequently, the movement gear (the motor unit) is forcibly stopped and maintained to be in a non-driven state. The stress relaxing movement is performed in order to relax an excessive stress, which is generated relative to the latch mechanism and the like during the close movement. In the stress relaxing movement, the movement gear is normally stopped at a position closer to the door-fully-closing side, so that the holding of the vehicle door by means of the latch mechanism is not released.

However, according to JP2002-250163A, the movement gear is forcibly stopped, after the stress relaxing movement in response to the abnormal performance of the neutral switch. Therefore, after the abnormal performance, the release movement is not allowed to be performed in response to the detection of the signal for requesting the opening movement of the vehicle door. Accordingly, the opening movement of the vehicle door is not performed in response to the operation by the user, and the operation of the vehicle door may become less convenient.

On the other hand, in a case where the release movement is performed even after the stress relaxing movement in response to the abnormal performance of the neutral switch, in order to improve convenience, a positional error of the movement gear may be accumulated, and the accuracy of movement of the latch mechanism may be deteriorated.

A need thus exists for an apparatus for controlling an opening-and-closing member for a vehicle, which is not susceptible to the drawback mentioned above.

SUMMARY

According to an aspect of this disclosure, an apparatus for controlling an opening-and-closing member for a vehicle includes: a latch mechanism; a driving lever provided to be interlocked with the latch mechanism; a neutral position detecting portion detecting that the driving lever is in a predetermined neutral position for releasing the latch mechanism; and a controlling portion performing a close movement, in which the driving lever is driven in one direction from the neutral position so as to hold the opening-and-closing member by means of the latch mechanism, a release movement, in which the driving lever is driven in the other direction from the neutral position in response to a detection of a request for a movement of the opening-and-closing member so as to release the holding of the opening-and-closing member by means of the latch mechanism, and a returning movement, in which the driving lever is driven in a reverse direction so as to return the driving lever to the neutral position after the close movement or the release movement, the controlling portion including a stress relaxing portion executing a driving of the driving lever in a reverse direction toward the neutral position for a predetermined time or by a predetermined amount after the close movement, in a case of a detection failure where the neutral position detecting portion does not detect that the driving lever is in the neutral position, a prohibiting portion executing a prohibition of the driving of the driving lever after the driving of the driving lever in the reverse direction by means of the stress relaxing portion, in response to the detection of the request for the movement of the opening-and-closing member, and a cancelling portion cancelling the prohibition of the driving of the driving lever by means of the prohibiting portion in a case where the number of times of the detection failures is less than a predetermined plural number of times.

According to another aspect of this disclosure, the apparatus for controlling the opening-and-closing member for the vehicle includes: a latch mechanism configured to be switched to a fully-latched state for holding a vehicle door, a half-latched state for half-holding the vehicle door, and an unlatched state for releasing the vehicle door; a driving lever configured to be interlocked with the latch mechanism, and driven to pivot by a power source; a neutral position detecting portion detecting that the driving lever is in a predetermined neutral position where the interlocking between the latch mechanism and the driving lever is released; a latch detecting portion detecting a state of the latch mechanism a portion for detecting a request for a movement detecting the request for an opening movement or a closing movement of the vehicle door, and the controlling portion executing a driving of the power source so as to drive the driving lever in one direction from the neutral position in order to switch the latch mechanism from the half-latched state to the fully-latched state after the driving lever is switched from unlatched state to the half-latched state according to the closing movement or the opening movement of the vehicle door. When the request for the opening movement or the closing movement of the vehicle door is detected, the controlling portion executes the driving of a power source so as to drive the driving lever in the other direction from the neutral position in order to switch the latch mechanism from the fully-latched state or the half-latched state to the unlatched state. After the driving lever is switched to the fully-latched state or the unlatched state the controlling portion executes the driving of the power source so as to return the driving lever to the neutral position. In a case of a detection failure where the neutral position detecting portion does not detect that the driving lever is in the neutral position, the stress relaxing portion executing a stress relaxing movement for the latch mechanism and the driving lever, in which the power source is driven in the reverse direction so as to pivot the driving lever toward the neutral position for a predetermined time or by a predetermined amount after the latch mechanism is switched from half-latched state to the fully-latched state. After the stress relaxing movement by means of the stress relaxing portion, the prohibiting portion prohibiting the driving of the power source in response to the detection of the request for the movement of the vehicle door. In a case where the number of times of the detection failures is less than the predetermined plural number of times, the cancelling portion cancelling the prohibition of the driving of the power source by means of the prohibiting portion and switching the latch mechanism from fully-latched state or the half-latched state to the unlatched state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
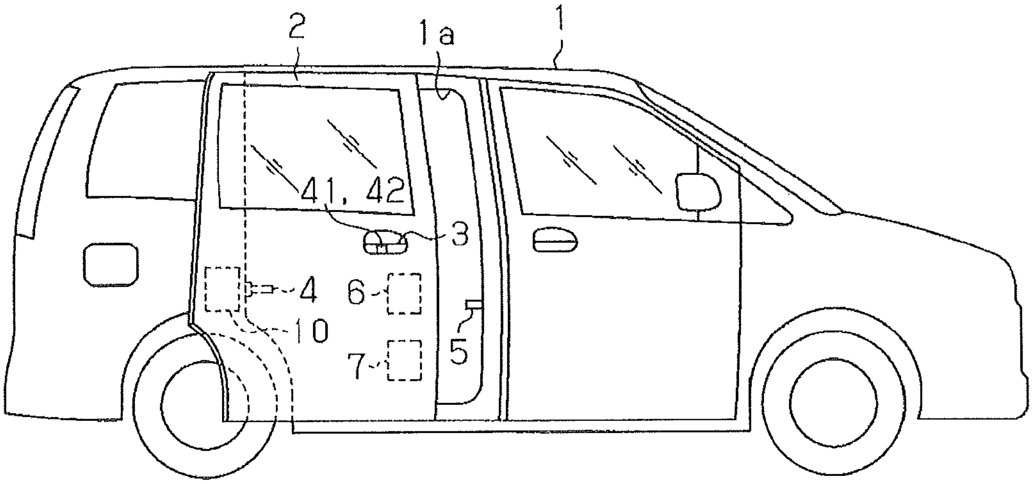
FIG. 1 is a side view illustrating an embodiment of an apparatus for controlling an opening-and-closing member for a vehicle.

An embodiment of an apparatus for controlling an opening-and-closing member for a vehicle will be described hereinafter with reference to the attached drawings. FIG. 1 is a side view illustrating the vehicle, on which the apparatus for controlling the opening-and-closing member for the vehicle according to the embodiment is mounted. As illustrated in FIG. 1, an opening portion 1*a*, through which a user gets in and out the vehicle, is formed at a side portion of a vehicle body 1. A slide door (an opening-and-closing member, a vehicle door) 2 is supported at the vehicle body 1 by means of supporting members so as to be movable in a front-rear direction of the vehicle. When the slide door 2 moves in the front-rear direction of the vehicle, the opening portion 1*a* is opened/closed accordingly by means of the slide door 2. Hereinafter, an opening and a closing of the opening portion 1*a* by means of the slide door 2 will be referred to as an opening and a closing of the slide door 2.

An outside grip 3 is fixed at an exterior surface of the slide door 2 at a front portion thereof. The outside grip 3 is formed into a substantially bow shape, extending in the front-rear direction of the vehicle. A close switch (a portion for detecting a request for a movement) 41 and an open switch (a portion for detecting a request for a movement) 42 are provided at the outside grip 3 so as to be exposed to an outside of the slide door 2. The close switch 41 and the open switch 42 output operational signals for requesting a movement of the slide door 2 (a request for a closing movement of the slide door 2 and a request for an opening movement of the slide door 2).

Figure 2:
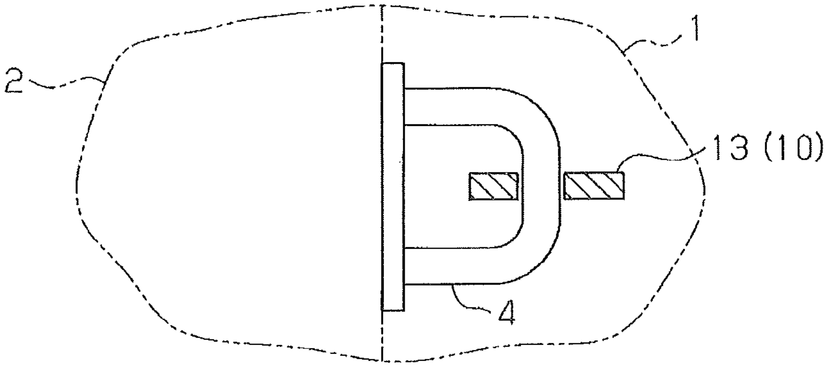
FIG. 2 is an enlarged view illustrating a door lock device.

A first striker 4, formed into a substantially U shape, is fixed at a rear end portion of the opening portion 1*a* (see FIG. 2). Further, a door lock device 10 is arranged in an inner side of the slide door 2 at a rear end portion thereof so as to correspond the first striker 4. The door lock device 10 is engageable with and disengageable from the first striker 4. Likewise, a second striker 5, formed into a substantially U shape, is fixed at a front end portion of the opening portion 1*a*. Further, a front lock 6 is arranged in an inner side of the slide door 2 at a front end portion thereof so as to correspond to the second striker 5. The front lock 6 is engageable with and disengageable from the second striker 5. The door lock device 10 and the front lock 6 engage with the first and second strikers 4 and 5, respectively, thereby holding the slide door 2 relative to the vehicle body 1 in a fully-closed state. Further, a full-opening lock 7 is arranged in an inner side of the slide door 2 at a front end portion thereof. The full-opening lock 7 is engageable with a rear end portion of the opening portion 1*a*. When the slide door 2 is opened, the full-opening lock 7 engages with the rear end portion of the opening portion 1*a*, thereby holding the slide door 2 relative to the vehicle body 1 in a fully-opened state.

As illustrated in FIGS. 3A to 3D and FIGS. 4A to 4D, the door lock device 10 includes a latch mechanism 12. The latch mechanism 12 is supported at the slide door 2 via a base plate, fixed at the slide door 2. The latch mechanism 12 includes a latch 13 and a pawl 14. The latch 13 and the pawl 14 are arranged at the base plate so as to be pivotable around first and second pivot shafts 12*a* and 12*b*, respectively, which are arranged to be in parallel with each other. The latch mechanism 12 engages with and disengages from the first striker 4.

More specifically, the latch 13, which includes an engagement recessed portion 13*a*, is formed into a substantially U shape. Further, the latch 13 includes a first protruding portion 13*b* at one side of the engagement recessed portion 13*a* (at a position pivoted from the engagement recessed portion 13*a* in a clockwise direction in FIG. 3A) and a second protruding portion 13*c* at the opposite side of the engagement recessed portion 13*a* (at a position pivoted from the engagement recessed portion 13*a* in a counter-clockwise direction in FIG.

3A). A first engagement portion 13*d* is formed at an end portion of the first protruding portion 13*b* on a side opposite from the engagement recessed portion 13*a*. A second engagement portion 13*e* is formed at an end portion of the second protruding portion 13*c* on a side facing the engagement recessed portion 13*a*. The latch 13 is engaged with one end of a latch biasing spring, the other end of which is held at the base plate, thereby being biased so as to pivot in the clockwise direction in FIG. 3A. Further, when the latch 13 contacts a latch stopper, provided at the base plate, further pivoting of the latch 13 in the clockwise direction in FIG. 3A is restricted, and the latch 13 is held at a predetermined pivot position shown in FIG. 3A.

Figure 3A:
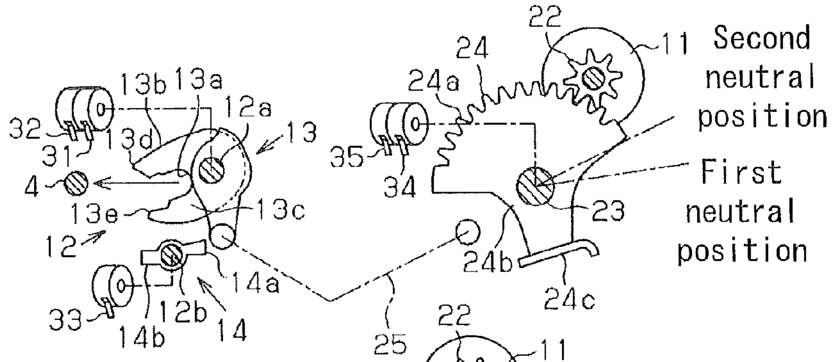
FIG. 3A is an explanatory view illustrating a movement of the door lock device at the time of a closing operation.

On the other hand, the pawl 14 is includes an engagement end portion 14*a*, which extends from the second pivot shaft 12*b* in one direction (in a right direction in FIG. 3A), and an extending end portion 14*b*, which extends from the second pivot shaft 12*b* in the opposite direction (in a left direction in FIG. 3A). The pawl 14 is engaged with one end of a pawl biasing spring, the other end of which is held at the base plate, and thereby being biased so as to pivot in the counter-clockwise direction in FIG. 3A (in a direction where the engagement end portion 14*a* pivots upwardly in FIG. 3A). Further, when the pawl 14 contacts a pawl stopper, provided at the base plate, further pivoting of the pawl 14 in the counter-clockwise direction in FIG. 3A is restricted, and the pawl 14 is held at a predetermined pivot position shown in FIG. 3A.

A basic movement of the latch mechanism 12 will be described hereinafter. In a state where the slide door 2 is open, as illustrated in FIGS. 3A and 4D, the latch 13 contacts the latch stopper so as to be held at the predetermined pivot position, and the engagement recessed portion 13*a* faces a path of the first striker 4, along which the first striker 4 advances in response to the closing movement of the slide door 2. Further, the pawl 14 contacts the pawl stopper so as to be held at the predetermined pivot position, and the engagement end portion 14*a* is positioned below the second protruding portion 13*c*. Such state of the latch mechanism 12 is referred to as an unlatched state (a released state).

Figure 3B:
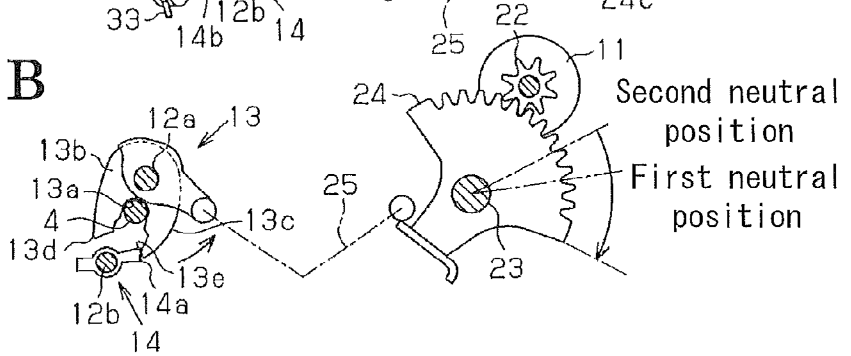
FIG. 3B is an explanatory view illustrating a movement of the door lock device at the time of the closing operation.
Figure 3C:
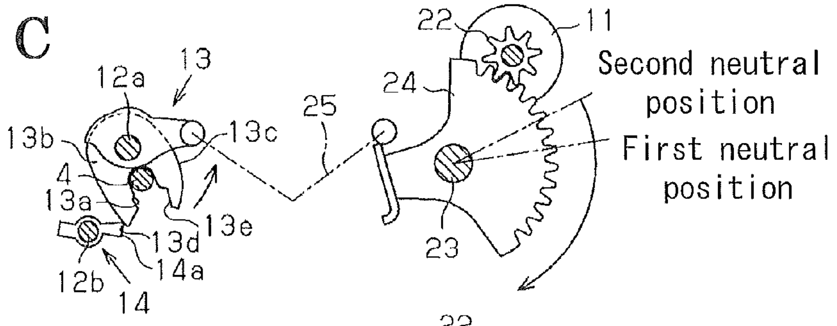
FIG. 3C is an explanatory view illustrating a movement of the door lock device at the time of the closing operation.
Figure 3D:
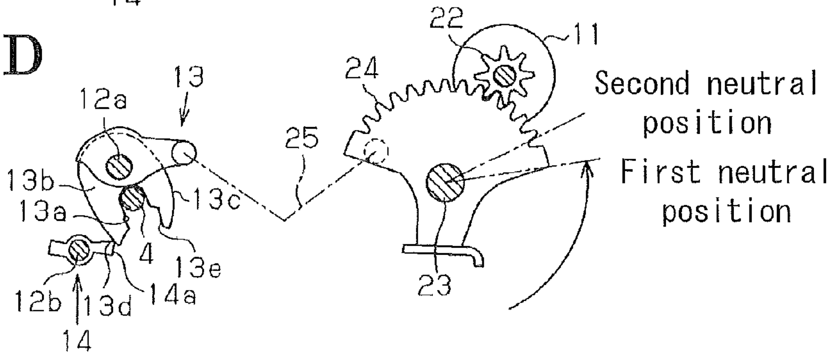
FIG. 3D is an explanatory view illustrating a movement of the door lock device at the time of the closing operation.

Subsequently, in response to the closing movement of the slide door 2, the first striker 4 advances into the engagement recessed portion 13*a* while thrusting an inner wall surface of the engagement recessed portion 13*a*. Consequently, as illustrated in FIG. 3B, the latch 13 pivots in a counter-clockwise direction in FIG. 3B against a biasing force of the latch biasing spring. Then, when the second engagement portion 13*e* engages with the engagement end portion 14*a*, the latch 13 stops to pivot. At that time, the slide door 2 is in a half-closed state where the latch 13 engages with the first striker 4 at the engagement recessed portion 13*a* so as not to be released therefrom. Such state of the latch mechanism 12 is referred to as a half-latched state.

In the half-latched state of the latch mechanism 12, when the latch 13 is driven so as to further pivot in the counter-clockwise direction in FIG. 3B, as illustrated in FIGS. 3C and 3D and FIGS. 4A and 4B, the first striker 4, which is advancing into the engagement recessed portion 13*a* of the latch 13, is further dragged therein. Then, when the first engagement portion 13*d* engages with the engagement end portion 14*a*, the latch 13 stops to pivot. At that time, the slide door 2 is in a fully-closed state where the latch 13 engages with the first striker 4 at the engagement recessed portion 13*a* so as not to be released therefrom. Such state of the latch mechanism 12 is referred to as a fully-latched state (an engaged state).

Figure 4A:
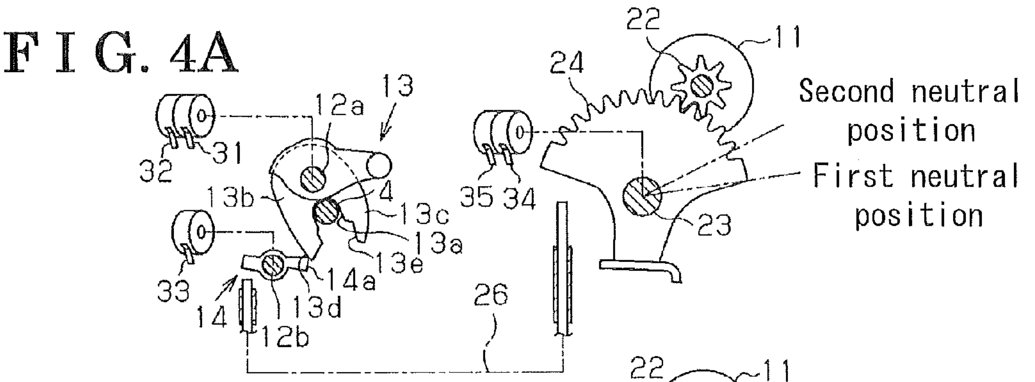
FIG. 4A is an explanatory view illustrating a movement of the door lock device at the time of an releasing operation.
Figure 4B:
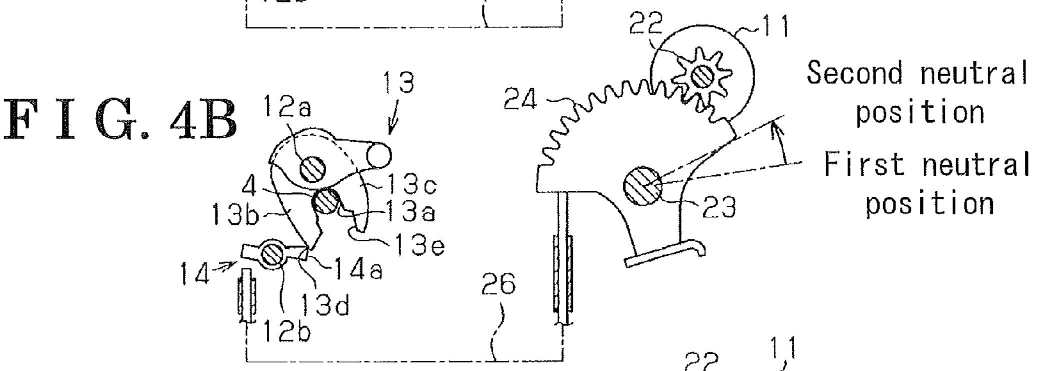
FIG. 4B is an explanatory view illustrating a movement of the door lock device at the time of the releasing operation.
Figure 4C:
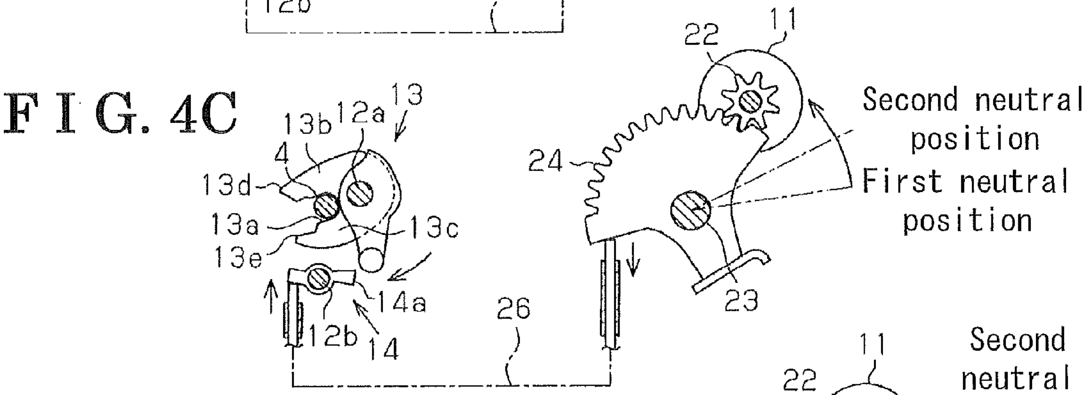
FIG. 4C is an explanatory view illustrating a movement of the door lock device at the time of the releasing operation.
Figure 4D:
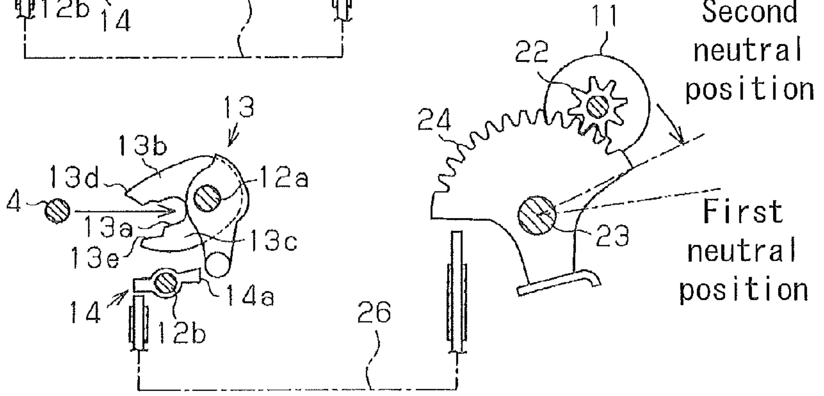
FIG. 4D is an explanatory view illustrating a movement of the door lock device at the time of the releasing operation.

Further, in the above-described half-latched state or the fully-latched state of the latch mechanism 12, when the pawl 14 is driven so as to further pivot in a clockwise direction in FIGS. 4A and 4B, as illustrated in FIG. 4C, the engagement between the engagement end portion 14*a* and the first engagement portion 13*d* or the engagement between the engagement end portion 14*a* and the second engagement portion 13*e* is released. At that time, the latch 13 is biased by the latch biasing spring so as to pivot in the clockwise direction in FIG. 3A while thrusting the first striker 4 at the inner wall surface of the engagement recessed portion 13*a*. Consequently, when the engagement between the latch 13 and the first striker 4 at the engagement recessed portion 13*a* is released, the slide door 2 is allowed to be opened.

Configurations for driving the latch mechanism 12 (the latch 13 and the pawl 14) will be described hereinafter. The door lock device 10 includes a pinion 22. The pinion 22 is supported at the slide door 2 via a bracket, fixed at the slide door 2. The pinion 22 is connected to an output shaft of a first DC motor (a power source) 11 so as to integrally rotate therewith. An active lever (a driving lever) 24, made of a metal plate and formed into a substantially sector shape, is arranged at the bracket so as to be pivotable about a third pivot shaft 23 whose axis extends in a different direction from axes of the first and second pivot shafts 12*a* and 12*b* of the latch 13 and the pawl 14, respectively, and in parallel with a pivot axis of the pinion 22. The active lever 24 includes a gear portion 24*a*, which is formed at the active lever 24 so as to extend along an arc-shaped end portion of the active lever 24 so as to engage with the pinion 22. The active lever 24, which is driven by means of the first DC motor 11, is held at a pivot position due to an engagement between the gear portion 24*a* of the active lever 24 and the pinion 22. Normally, the active lever 24 is set to be held at a predetermined neutral position shown in FIGS. 3D and 4A (which will be referred to as a first neutral position) where the active lever 24 engages with the pinion 22 at a substantially intermediate portion of the gear portion 24*a* in a circumferential direction of the active lever 24, or at a predetermined neutral position shown in FIGS. 3A and 4D (which will be referred to as a second neutral position). A range where the active lever 24 is positioned between the first and second neutral positions will be referred to as a neutral range.

As illustrated in FIGS. 3A to 3D, the active lever 24 is interlocked with the latch 13 via a close movement mechanism 25. In the half-latched state of the latch mechanism 12, when the active lever 24 pivots in the clockwise direction in FIG. 3B, a pivotal force of the active lever 24 is transmitted to the latch 13. Consequently, the latch 13 pivots in the counter-clockwise direction in FIG. 3B until the latch 13 contacts the pawl 14 and the pivoting of the latch 13 is stopped by means the pawl 14. Consequently, the latch mechanism 12 is switched to the fully-latched state.

Further, as illustrated in FIGS. 4A to 4D, the active lever 24 is interlocked with the pawl 14 via a release movement mechanism 26. In the fully-latched state of the latch mechanism 12, when the active lever 24 pivots in a counter-clockwise direction in FIG. 3C, a pivotal force of the active lever 24 is transmitted to the pawl 14. Consequently, the pawl 14 pivots in a clockwise direction in FIG. 4C so that the above-mentioned stopping of the latch 13 from pivoting by means of the pawl 14 is released. Consequently, the latch mechanism 12 is switched to the unlatched state.

When the pivot position of the active lever 24 is in the above-mentioned neutral range, both of the latch 13 and the pawl 14 are set to be released from the active lever 24. As illustrated in FIGS. 3A and 4A, the door lock device 10 includes a half-latch switch (a latch detecting portion) 31 and a full-latch switch (a latch detecting portion) 32, each of which is configured by a rotary switch. Each of the half-latch switch 31 and the full-latch switch 32 detects a pivot position of the latch 13. More specifically, the half-latch switch 31 detects that the latch 13 is at a pivot position corresponding to the half-latched state (which will be hereinafter referred to as a half-latch position). On the other hand, the full-latch switch 32 detects that the latch 13 is at a pivot position corresponding to the fully-latched state (which will be hereinafter referred to as a full-latch position). The door lock 10 further includes a pawl switch 33, which is configured by a rotary switch. The pawl switch 33 detects a pivot position of the pawl 14. More specifically, the pawl switch 33 detects a pivotal movement of the pawl 14 in accordance with the switching of the latch mechanism 12 to the half-latched state or the fully-latched state.

Figure 5:
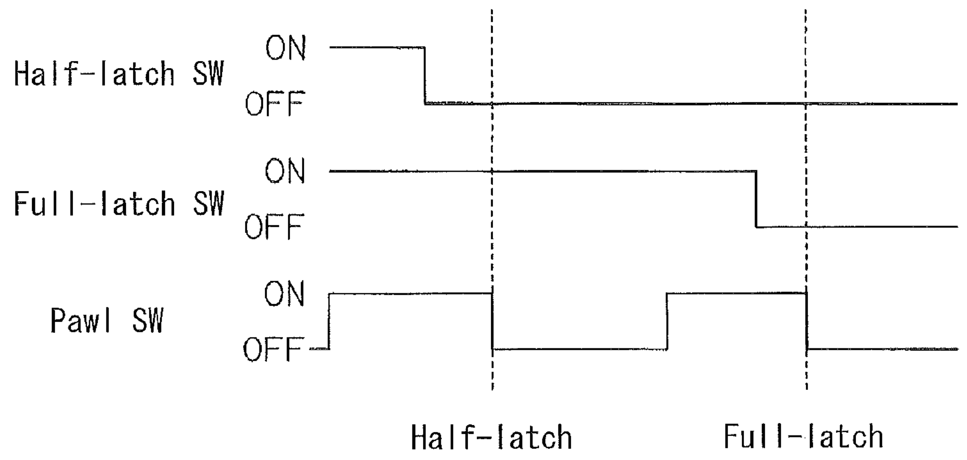
FIG. 5 is a timing chart illustrating changes of detection signals from latch switches.

FIG. 5 is a timing chart illustrating a relationship between a state of the latch mechanism 12 and detection signals from half-latch switch 31 and the like. As illustrated in FIG. 5, the half-latch switch 31 detects a signal, which is switched from ON to OFF immediately before the latch mechanism 12 is switched from the unlatched state to the half-latched state, and outputs the signal as a detection signal. The full-latch switch 32 detects a signal, which is switched from ON to OFF immediately before the latch mechanism 12 is switched from the half-latched state to the fully-latched state, and outputs the signal as a detection signal. The pawl switch 33 detects a signal, which is switched from OFF to ON when the pawl 14 starts to pivot in response to a switching of the latch mechanism 12 from the unlatched state to the half latched state, and outputs the signal as a detection signal. Further, the pawl switch 33 detects a signal, which is switched from ON to OFF when the pawl 14 stops to pivot in response to a completion of the switching of the latch mechanism 12 to the half-latched state, and outputs the signal as a detection signal. Further, the pawl switch 33 detects a signal, which is switched from OFF to ON when the pawl 14 starts to pivot in response to a switching of the latch mechanism 12 from half-latched state to fully-latched state, and outputs the signal as a detection signal. Further, the pawl switch 33, detects a signal, which is switched from ON to OFF when the pawl 14 stops to pivot in response to a completion of the switching of the latch mechanism 12 to the fully-latched state, and outputs the signal as a detection signal.

As illustrated in FIGS. 3A and 4A, the door lock device 10 includes a first neutral position detecting switch (a neutral position detecting portion) 34 and a second neutral position detecting switch (a neutral position detecting portion) 35, each of which is configured by a rotary switch. The first and second neutral position detecting switches 34 and 35 detect a pivot position of the active lever 24. More specifically, the first neutral position detecting switch 34 detects that the active lever 24 is positioned at the first neutral position. Likewise, the second neutral position switch 35 detects that the active lever 24 is positioned at the second neutral position.

Figure 6:
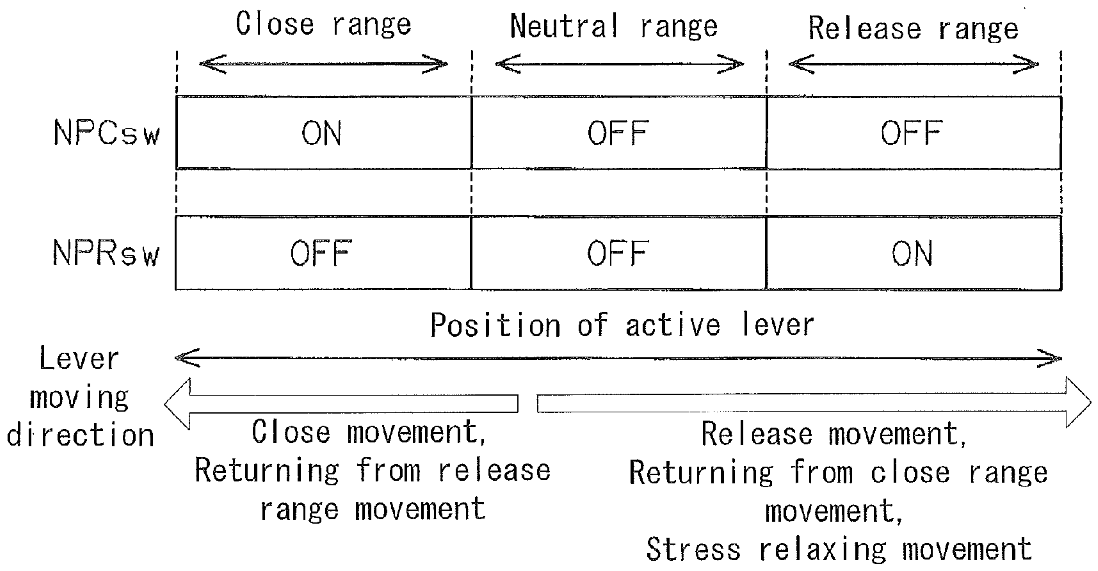
FIG. 6 is a timing chart illustrating changes of detection signals from neutral switches.

FIG. 6 is a timing chart illustrating a relationship between the detection signals from the first and second neutral position detecting switches 34 and 35 and the active lever 24, which is positioned within the neutral range, at a pivot position on a side where the latch mechanism 12 is switched to the fully-latched state (which will be hereinafter referred to as a close range), and at a pivot position on a side where the latch mechanism 12 is switched to the unlatched state (which will be hereinafter referred to as a release range). As illustrated in FIG. 6, a detection signal NPCsw, outputted from the first neutral position detecting switch 34, is set to be ON when the active lever 24 is within the close range, and is set to be OFF when the active lever 24 is within the neutral range or the release range. ON the other hand, a detection signal NPRsw, outputted from the second neutral position detecting switch 35, is set to be ON when the active lever 24 is within the release range, and is set to be OFF when the active lever 24 is within the close range or the neutral range. In other words, the first neutral position detecting switch 34 detects a signal, which is switched from ON to OFF when the active lever 24 moves from the close range to the neutral range, and outputs the signal as a detection signal NPCsw. Likewise, the second neutral position detecting switch 35 detects a signal, which is switched from ON to OFF when the active lever 24 moves from the release range to the neutral range, and outputs the signal as a detection signal NPRsw.

The front lock 6 includes a latch mechanism (a latch and a pawl) similar to the latch mechanism 12 of the door lock device 10. For example, when the latch mechanism 12 of the door lock device 10 is switched to the half-latched state, the latch mechanism of the front lock 6 is also switched to a half-latched state in a synchronous manner. Therefore, when the door lock device 10 is driven by means of the first DC motor 11, and the first striker 4 is dragged into the latch 13 in the above-described manner, the latch (an engagement recessed portion) of the front lock 6 is thrust by means of the second striker 5 so as to pivot in response to the closing movement of the slide door 2 until the pivot of the latch is stopped by the pawl. Then, the latch mechanism of the front lock 6 is switched to a fully-latched state synchronously with the latch mechanism 12 of the door lock device 10. Consequently, the slide door 2 is held in a fully-closed state by means of both of the door lock device 10 and the front lock 6.

The pawl of the front lock 6 is connected to the first DC motor 11 of the door lock device 10 via a transmitting member so as to be driven by the first DC motor 11. The pawl of the front lock 6 and the pawl 14 of the door lock device 10 are interlocked. Therefore, in the fully-latched state (alternatively, the half-latched state) of the latch mechanism 12 and the latch mechanism of the front lock 6, when the first DC motor 11 is driven so as to pivot the pawl 14 of the door lock device 10 in the above-described manner, the pawl of the front lock 6 also pivots in an interlocking manner. Consequently, the latch mechanism of the front lock 6 and the latch mechanism 12 of the door lock device 10 are switched to the unlatched state synchronously. Accordingly, the engagement between the door lock device 10 and the first striker 4 and between the front lock 6 and the second striker 5 are released and the slide door 2 is allowed to be opened (an opening movement of the slide door 2 becomes possible).

On the other hand, the full-opening lock 7 also includes a latch mechanism (a latch and a pawl) similar to the latch mechanism 12 of the door lock device 10. The latch mechanism (the latch and the pawl) of the full-opening lock 7 is connected to the first DC motor 11 of the door lock device 10 via a transmitting member so as to be driven by the first DC motor 11. The latch mechanism (the latch and the pawl) of the full-opening lock 7 and the latch mechanism 12 (the latch 13 and the pawl 14) of the door lock device 10 are interlocked. For example, in a state where the latch mechanism of the full-opening lock 7 is switched to the half-latched state in response to the opening movement of the slide door 2, when the first DC motor 11 is driven so as to (idly) pivot the latch 13 of the door lock device 10 in the above-described manner, the latch of the full-opening lock 7 also pivots in an interlocking manner. Consequently, the latch of the full-opening lock 7 is switched to the fully-latched state. Accordingly, the slide door 2 is held in the fully-opened state by means of the full-opening lock 7.

In the fully-latched state (alternatively, the half-latched state) of the latch mechanism of the full-opening lock 7, when the first DC motor 11 is driven so as to (idly) pivot the pawl 14 of the door lock device 10 in the above-described manner, the pawl of the full-opening lock 7 also pivots in an interlocking manner. Consequently, the pawl of the full-opening lock 7 is switched to the unlatched state. Accordingly, the slide door 2 is allowed to be opened (the closing movement of the slide door 2 becomes possible).

Figure 7:
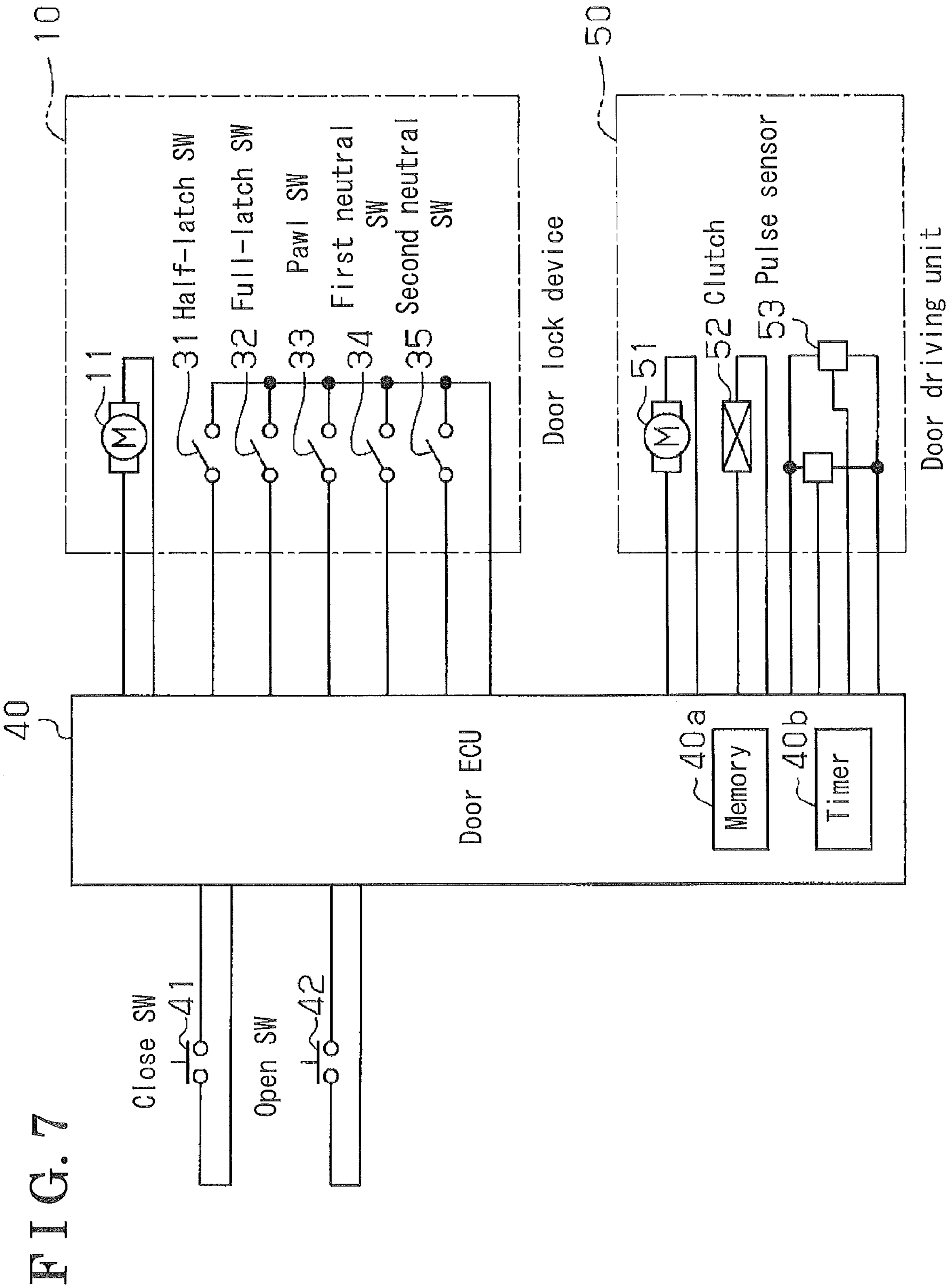
FIG. 7 is a block diagram illustrating an electrical configuration of the apparatus for controlling the opening-and-closing member for the vehicle according to the embodiment.

An electrical configuration of the apparatus for controlling the opening-and-closing member for the vehicle will be described hereinafter. FIG. 7 is a block diagram illustrating the electrical configuration of the apparatus for controlling the opening-and-closing member for the vehicle according to the embodiment. As illustrated in FIG. 7, a door Electronic Control Unit (which will be hereinafter referred to as a door ECU) (a controlling portion) 40 is mounted on the vehicle. The door ECU 40 is configured mainly by, for example, a micro controller (MCU). A memory (a memorizing portion) 40*a*, having backup power source, and a timer 40*b*, serving as a timing device, and the like are embedded in the door ECU 40. The door ECU 40 is electrically connected to the first DC motor 11, the half-latch switch 31, the full-latch switch 32, the pawl switch 33 and the first and second neutral position detecting switches 34 and 35. The door ECU 40 controls the driving of the first DC motor 11 so as to control the pivot of the active lever 24 via the pinion 22, thereby controlling the switching of the latch mechanism 12 of the door lock device 10 and the like in the above-describer manner. The door ECU 40 determines that the latch mechanism 12 of the door lock device 10 and the like is in the half-latched state (the latch 13 is in the half-latched position) on the basis of the detection signal, outputted from the half-latch switch 31. The door ECU 40 determines that the latch mechanism 12 of the door lock device 10 and the like is in the fully-latched state (the latch 13 is in the fully-latched position) on the basis of the detection signal, outputted from the full-latch switch 32. The door ECU 40 determines that the active lever 24 is positioned at the first and second neutral positions on the basis of the detection signals NPCsw and NPRsw outputted from the first and second neutral position detecting switches 34 and 35, respectively.

The door ECU 40 is further electrically connected to a door driving unit 50. The door driving unit 50 includes a second DC motor 51, an electromagnetic clutch 52, a pulse sensor 53 and the like. For example, the second DC motor 51, fixed at the vehicle body 1 side is connected to the slide door 2 via a transmitting member (for example, a cable device) (Alternatively, the second DC motor 51, fixed at the slide door 2 side is connected to the vehicle body 1 via a transmitting member (for example, a cable device). The door ECU 40 controls a driving of the second DC motor 51 so as to control opening and closing of the slide door 2. Further, the door ECU 40 controls a driving of the electromagnetic clutch 52 so as to selectively establish a power transmission between the second DC motor 51 and the slide door 2. The power transmission is controlled to be established in order to electrically drive the slide door 2 so as to be opened and closed. On the other hand, the power transmission is interrupted in order to manually operate the slide door 2 so as to be opened and closed. Accordingly, the slide door 2 may be smoothly opened and closed. Further, the door ECU 40 determines a rotational direction (a forward rotation or a reverse rotation), a rotational amount and a rotational speed of the second DC motor 51 (i.e., a position and a speed (a moving speed) of the slide door 2 when the slide door 2 is opened and closed) on the basis of a pair of pulse signals, having different phases and outputted from the pulse sensor 53.

The door ECU 40 is further electrically connected to the close switch 41 and the open switch 42. The close switch 41 outputs an operational signal for requesting the closing movement of the slide door 2 in response to an operation of the user. The door ECU 40 controls the driving of the door driving unit 50 (the second DC motor 51 and the electromagnetic clutch 52) on the basis of the operational signal, outputted from the close switch 41, so as to perform the closing movement of the slide door 2, which has been in the opened-state. Further, after the latch mechanism 12 of the door lock device 10 and the latch mechanism of the front lock 6 are switched to the half-latched state in accordance with the driving of the door driving unit 50, the door ECU 40 controls the driving of the first DC motor 11 so as to switch the latch mechanism 12 to the fully-latched state. Accordingly, the slide door 2 is held at the fully-closed state. Further, in a case where the slide door 2 is held at the fully-opened state at the time when the close switch 41 is operated by the user, the door ECU 40 controls the driving of the first DC motor 11 so as to switch the latch mechanism of the full-opening lock 7 to the unlatched state before the door ECU 40 starts to drive the door driving unit 50, thereby switching the slide door 2 to a state where the closing movement is performable.

The open switch 42 outputs an operational signal for requesting the opening movement of the slide door 2 in response to an operation of the user. The door ECU 40 controls the driving of the first DC motor 11 on the basis of the operational signal, outputted from the open switch 42, so as to switch the latch mechanism 12, which has been in the fully-latched state (half-latched state) to the unlatched state. Consequently, the door ECU 40 controls the driving of the door driving unit 50 (the second DC motor 51 and the electromagnetic clutch 52) so as to perform the opening movement of the slide door 2, whose opening movement has become possible. Further, after the latch mechanism of the full-opening lock 7 is switched to the half-latched state in accordance with the driving of the door driving unit 50, the door ECU 40 controls the driving of the first DC motor 11 so as to switch the latch mechanism of the full-opening lock 7 to the fully-latched state. Accordingly, the slide door 2 is held in the fully-opened state.

Figure 8:
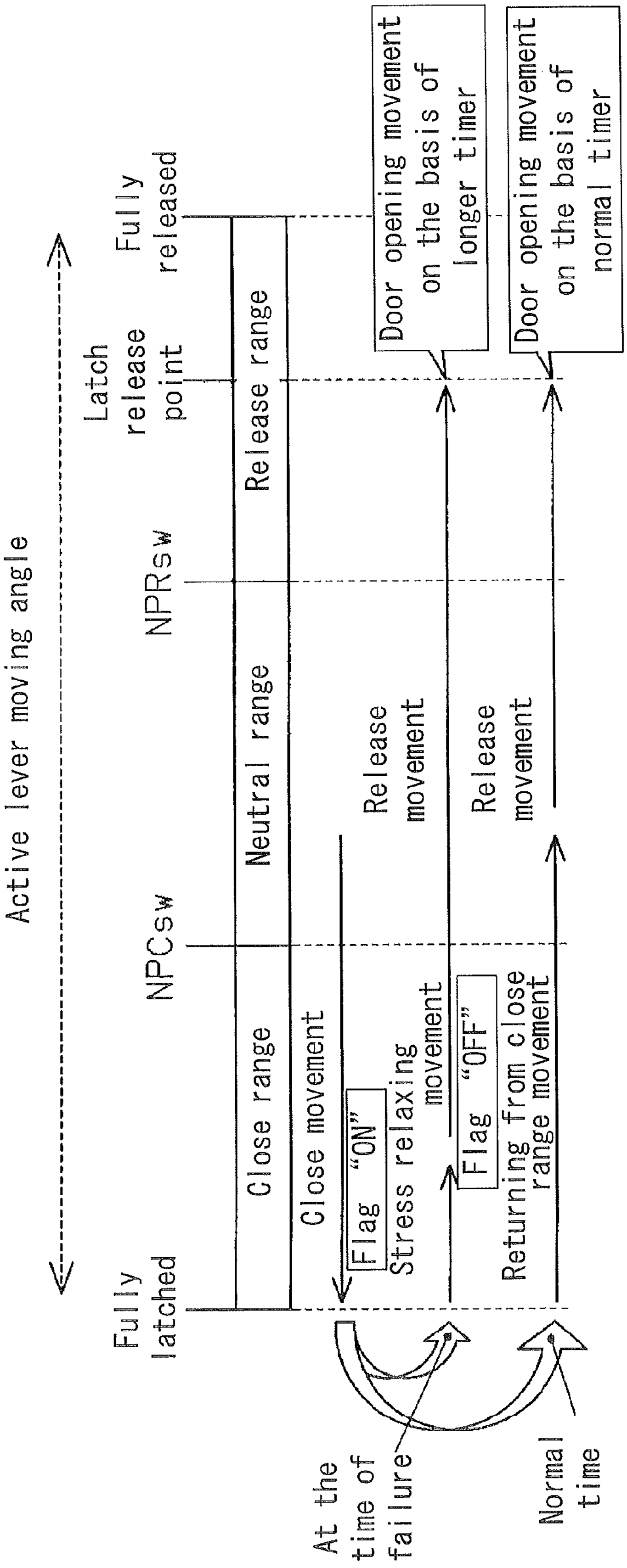
FIG. 8 is an explanatory diagram illustrating a relationship between a pivot position of an active lever and a change of a state of a latch mechanism.

FIG. 8 is an explanatory diagram illustrating a relationship between a pivot position (a moving angle) of the active lever 24 and a change of a state of the latch mechanism 12. A manner of the controlling of the door lock device 10 by means of the door ECU 40 will be further described hereinafter on the basis of FIG. 8 with reference to FIGS. 3A to 6.

The closing movement of the slide door 2 will be described hereinafter, beginning from a state where the active lever 24 is positioned in the neutral range (at the second neutral position shown in FIG. 3A). As described-above, when the closing movement of the slide door 2 starts to be performed, the latch mechanism 12 is switched from unlatched state to the half-latched state (see FIG. 3B). Immediately before the latch mechanism 12 is switched from the unlatched state to the half-latched state, the signal, which is switched from ON to OFF, is detected by means of the half-latch switch 31 as a detection signal (see FIG. 5). Then, the door ECU 40 drives the first DC motor 11 so as to pivot the active lever 24, thereby switching the latch mechanism 12 to the fully-latched state (see FIG. 3C). Accordingly, the slide door 2 is held at the fully-closed state (a close movement). Further, during the close movement, when the active lever 24 is further pivoted in the clockwise direction in FIG. 3C from the first neutral position, the signal, which is switched from OFF to ON, is detected by means of the first neutral position detecting switch 34 (see FIG. 6). The signal, detected by the second neutral position detecting switch 35, remains to be OFF.

Subsequently, when the signal, which is switched from ON to OFF, is detected by the full-latch switch 32 is (see FIG. 5), the switching of the latch mechanism 12 to the fully-latched state (the close movement) is completed. Therefore, the door ECU 40 determines whether or not the first neutral position detecting switch 34 is ON and whether or not the second neutral position detecting switch 35 is OFF (i.e., the active lever 24 is in the close range) (see FIG. 6). When the door ECU 40 determines that the first neutral position detecting switch 34 is ON and the second neutral position detecting switch 35 is OFF, the door ECU 40 drives the first DC motor 11 so as to pivot the active lever 24 in a reverse direction (in the counter clockwise direction in FIG. 3D), thereby returning the active lever 24 to the neutral range (the first neutral position shown in FIG. 3D and FIG. 4A) (a returning from close range movement, a returning movement). When the active lever 24 is further pivoted in the counter-clockwise direction in FIG. 3D from the first neutral position, and the signal, which is switched from ON to OFF, is detected by the first neutral position detecting switch 34 (see FIG. 6), the door ECU 40 stops the driving of the first DC motor 11. In a case of a detection failure where the signal, which is switched from ON to OFF, is not accidentally detected by the first neutral position detecting switch 34, the door ECU 40 stops the driving of the first DC motor 11 on the basis of the determination that the signal, which is switched from OFF to ON, is detected by the second neutral position detecting switch 35, or that a predetermined time TNPC, within which the active lever 24 is estimated to reach the neutral range, has elapsed.

In a case where it is not detected that the detection signal of the first neutral position detecting switch 34 is ON and the detection signal of the second neutral position detecting switch 35 is OFF at the time point where the close movement (the switching of the latch mechanism 12 to the fully-latched state) is completed, the door ECU 40 does not determine that the active lever 24 is in the close range. In such a case, the door ECU 40 drives the first DC motor 11 in the reverse direction so as to move the active lever 24 toward the neutral range (the first neutral position) for a predetermined time or a by a predetermined amount (a stress relaxing movement) (the door ECU 40 serves as a stress relaxing portion). Then, the door ECU 40 stops the driving of the first DC motor 11. In other words, the door ECU 40 performs the stress relaxing movement when the door ECU 40 determines an abnormal performance in the first and/or second neutral position detecting switches 34 and/or 35 at the time when the closing movement is completed. Accordingly, excessive stress, applied on the latch mechanism 12, the close movement mechanism 25 and the active lever 24 may be reduced. Further, there is less possibility that the latch 13, which is driven via the active lever 24 and the like, is mechanically constrained in a state where the first striker 4 is excessively dragged into the latch 13. When the stress relaxing movement is completed, the slide door 2 is switched to an opening movement waiting state (a standby state).

On the other hand, in a case where the operational signal for requesting the opening movement of the slide door 2 is outputted in response to the operation of the open switch 42 after the completion of the above-described returning from close range movement or stress relaxing movement, the door ECU 40 normally drives the first DC motor 11 so as to pivot the active lever 24, thereby switching the latch mechanism 12 to the unlatched state (see FIG. 4C). Consequently, the slide door 2 is released from being held in the fully-closed state (a release movement). When the active lever 24 is further pivoted in the counter-clockwise direction in FIG. 4B from the second neutral position (see FIG. 4B), the signal, which is switched from OFF to ON, is detected by the second neutral position detecting switch 35 (see FIG. 6). As described above, the detection signal of the first neutral position detecting switch 34 remains to be OFF.

Subsequently, when the door ECU 40 determines that the signal, which is switched from OFF to ON, is detected by the full-latch switch 32 (see FIG. 5), the door ECU 40 determines that the switching of the latch mechanism 12 to the unlatched state (the release movement) is completed. Further, in a case where the signal, which is switched from OFF to ON, is not accidentally detected by the full-latch switch 32, the door ECU 40 determines that the switching of the latch mechanism 12 to the unlatched state (the release movement) is completed on the basis of a determination that a time being longer than a predetermined time has elapsed after the start of the driving of the active lever 24. The predetermined time is set so that the release movement is estimated to be completed therewithin. More specifically, in a case where the returning from close range movement is performed after the previous close movement, the door ECU 40 determines the completion of the release movement on the basis of a determination that a time, being longer than a first predetermined time T1, has elapsed after the start of the driving of the active lever 24. On the other hand, in a case where the stress relaxing movement is performed after the previous closing movement, the door ECU 40 determines the completion of the release movement on the basis of a determination that a time, being longer than a second predetermined time T2, has elapsed after the start of the driving of the active lever 24. The second predetermined time T2 is set to be longer than the first predetermined time T1 because when the active lever 24 is at a pivot position after the stress relaxing movement, a longer time elapses after the start of the driving of the active lever 24 until completing the release movement, compared to when the active lever 24 is at a pivot position after the returning from close range movement (the neutral range). The door ECU 40 memorizes a movement, performed after the close movement (the returning from close range movement or the stress relaxing movement) in the memory 40*a*. The movement, performed after the close movement and memorized in the memory 40*a*, is reset when a power supply to the door ECU 40 is stopped. Therefore, according to the embodiment, when a power is re-supplied to the door ECU 40, the door ECU 40 determines the completion of the release movement on the basis of the determination that the time, being longer than the second predetermined time T2, has elapsed after the start of the pivot of the active lever 24.

When the ECU 40 determines the completion of the release movement, the door ECU 40 drives the first DC motor 11 in the reverse direction so as to pivot the active lever 24, thereby returning the active lever 24 toward the neutral range (the second neutral position shown in FIG. 4D) (a returning from release range movement, a returning movement). When the active lever 24 is further pivoted in the clockwise direction in FIG. 4D from the second neutral position, and the signal, which is switched from ON to OFF, is detected by the second neutral position detecting switch 35 (see FIG. 6), the door ECU 40 stops the driving of the first DC motor 11. In a case of a detection failure where the signal, which is switched from ON to OFF, is not detected as the detection signal NPRsw by the second neutral position detecting switch 35, the door ECU 40 stops the driving of the first DC motor 11 on the basis of the determination that the first neutral position detecting switch 34 is switched from OFF to ON, or that a predetermined time TNPR, within which the active lever 24 is estimated to reach the neutral range, has elapsed.

According to the embodiment, the door ECU 40 counts the number of times of abnormal performances of the first and second neutral position detecting switches 34 and 35 (the number of times of the detection failures where the detection of the first and second neutral position detecting switches 34 and 35 is impossible) as an abnormal count CN. In a case where the abnormal count CN reaches a plural predetermined number of times CNth, even when the operational signal for requesting the opening movement of the slide door 2 is outputted from the open switch 42, the door ECU 40 forcibly stops the driving of the first DC motor 11 so as to stop the pivot of the active lever 24 (the door ECU 40 serves as a prohibiting portion). In other words, in a case where the abnormal performance of the first and second neutral position detecting switches 34 and 35 is only temporary, and the abnormal count CN is less than the predetermined number of times CNth, when the operational signal for requesting the opening movement of the slide door 2 is outputted from the open switch 42, the door ECU 40 allows to drive the first DC motor 11 so as to pivot the active lever 24 (the door ECU 40 serves as a cancelling portion).

A manner of counting the abnormal count CN by means of the door ECU 40 will be described hereinafter. The door ECU 40 calculates a sum of a value of a close-side abnormal count CNPC and a value of release-side abnormal count CNPR, thereby calculating the abnormal count CN.

As described above, the door ECU 40 determines that the active lever 24 is in the close range on the basis of the determination that the detection signal NPCsw of the first neutral position detecting switch 34 is ON and that the detection signal NPRsw of the second neutral position detecting switch 35 is OFF. Therefore, the door ECU 40 increases the closing-side abnormal count CNPC when the detection signal NPCsw of the first neutral position detecting switch 34 is not ON and when the detection signal NPRsw of the second neutral position detecting switch 35 is not OFF after the completion of the close movement. Subsequently, as described above, the stress relaxing movement is performed after the completion of the close movement.

Further, as described above, when the signal NPCsw, which is switched from ON to OFF, is detected by the first neutral position detecting switch 34, the door ECU 40 ends the returning from close range movement. Therefore, the door ECU 40 increases the close-side abnormal count CNPC also when the returning from close range movement has not ended on the basis of the detection signal NPCsw. Furthermore, the door ECU 40 clears the close-side abnormal count CNPC when the returning from close range movement has ended on the basis of the detection signal NPCsw.

On the other hand, as described above, when the signal NPRsw, which is switched from ON to OFF, is detected by the second neutral position detecting switch 35, the door ECU 40 ends the returning from release range movement. Therefore, the door ECU 40 increases the release-side abnormal count CNPR also when the returning from release range movement has not ended on the basis of the detection signal NPRsw. Furthermore, the door ECU 40 clears the release-side abnormal count CNPC when the returning from release range movement has ended on the basis of the detection signal NPRsw.

The door ECU 40 adds the value of the close-side abnormal count CNPC to the value of the release-side abnormal count CNPR, each of which is counted in the above-described manner, thereby calculating the abnormal count CN. When a value of the abnormal count CN, which is calculated in such a manner, reaches the predetermined number of times CNth, the door ECU 40 determines that the performance of the first and second neutral position detecting switches 34 and 35 is abnormal. In such a case, even when the operational signal for requesting the opening movement of the slide door 2 is outputted from the open switch 42 after the completion of the stress relaxing movement, as described above, the door ECU 40 does not follow the request.

In the closing movement of the slide door 2, the movement of the full-opening lock 7, which is interlocked with the door lock device 10, (the close movement and the release movement) may be described similarly in such a way that the slide door 2 is held at the fully-opened state after the close movement, and that the closing movement of the slide door 2 becomes possible after the release movement. In this case, the operational signal for requesting the opening movement of the slide door 2 is outputted in response to the operation of the close switch 41.

Figure 9:
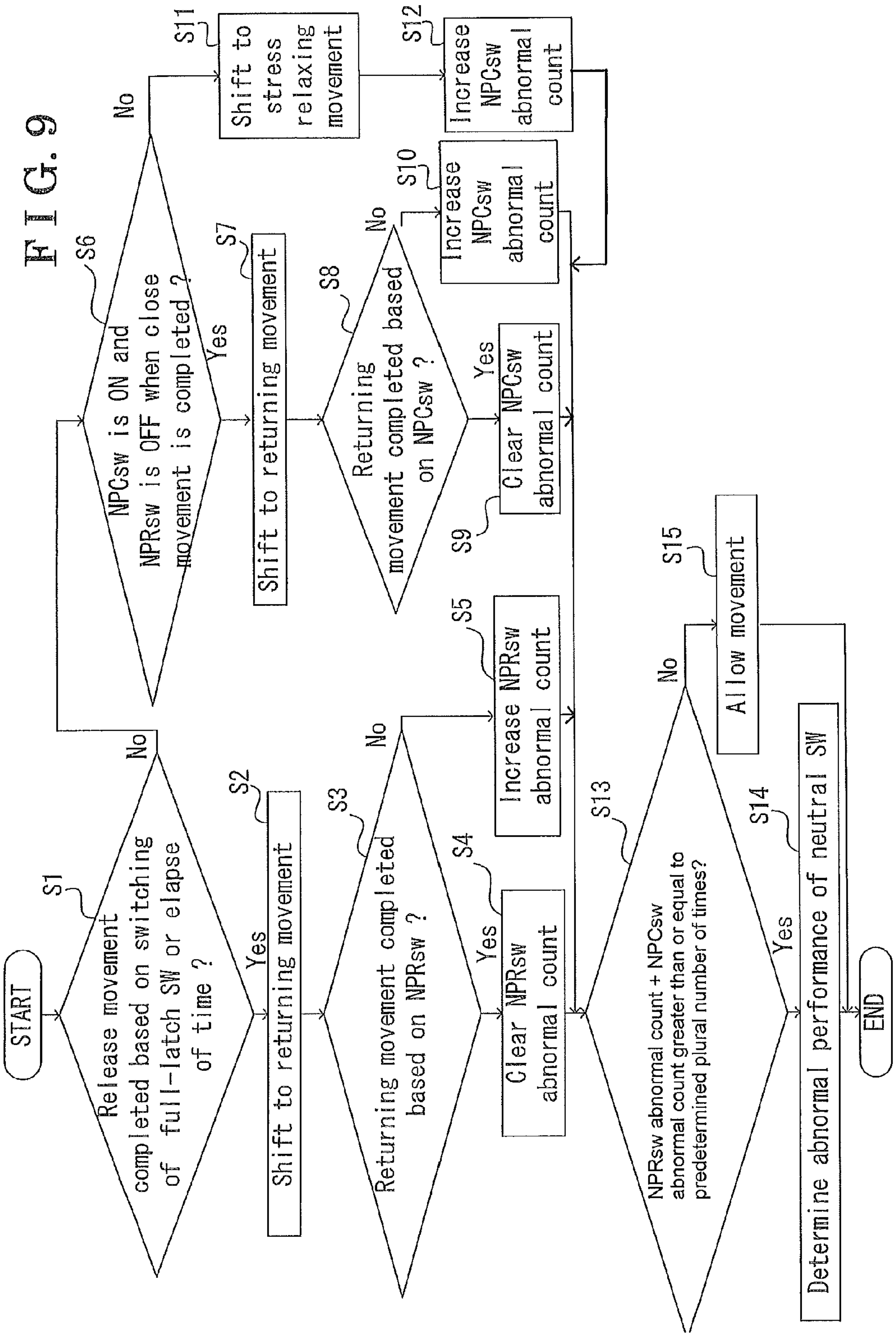
FIG. 9 is a flowchart illustrating a controlling manner according to the embodiment.
Figure 10:
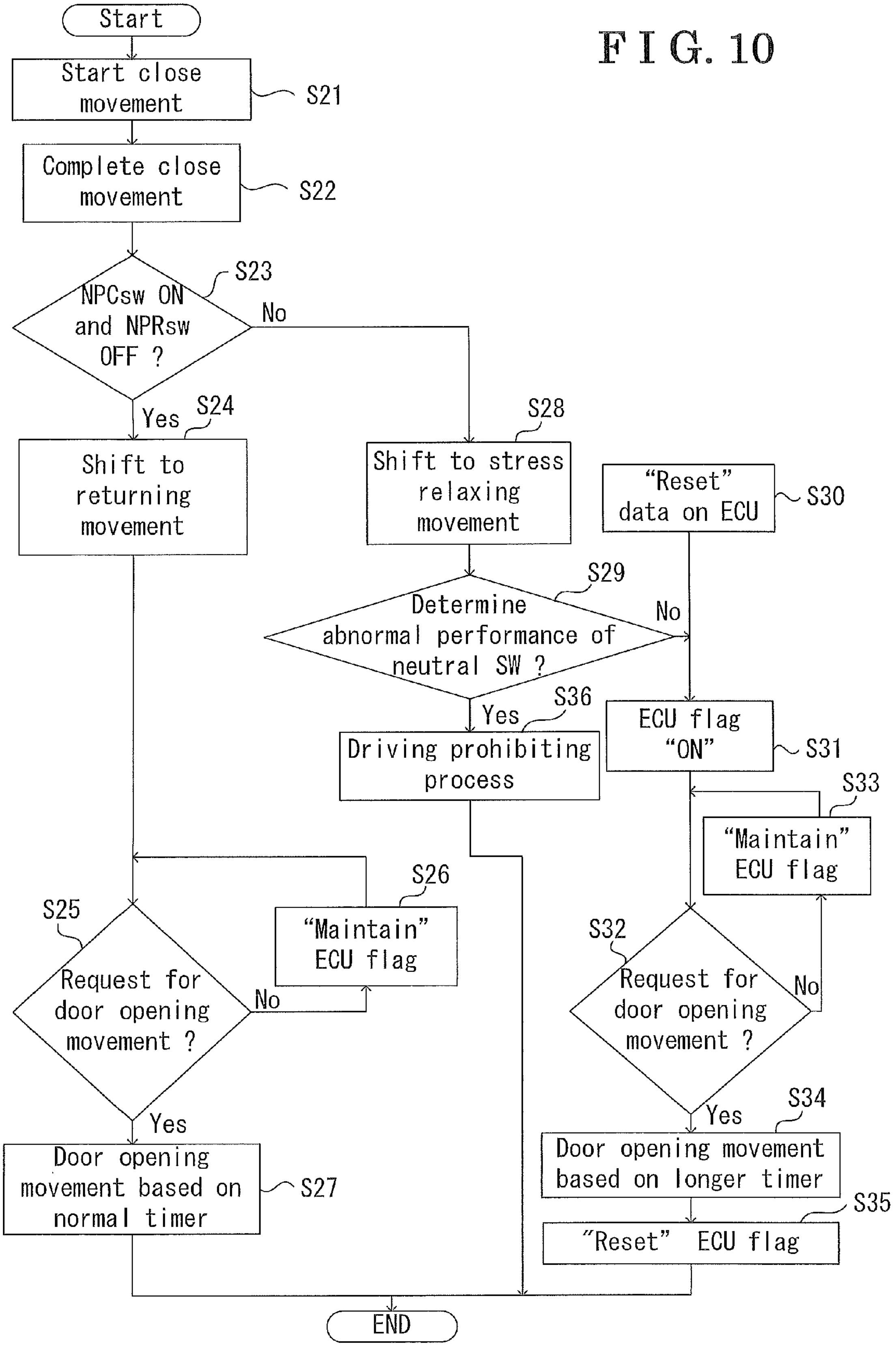
FIG. 10 is a flowchart illustrating a controlling manner according to the embodiment.

A movement of the apparatus for controlling the opening-and-closing member for the vehicle according to the embodiment will be described hereinafter with reference to the flowcharts shown in FIGS. 9 and 10. FIG. 9 illustrates a manner of processing with regard to a manner of determining the abnormal performance of the first and second neutral position switches 34 and 35. FIG. 10 illustrates a controlling manner of the drive of the door lock device 10, beginning from the start of the close movement.

As illustrated in FIG. 9, when the routine shown in FIG. 9 is started during the process, whether or not the release movement is completed is determined on the basis of the determination that the signal, which is switched from OFF to ON, is detected by the full-latch switch 32 or that the time, being longer than the predetermined time (the first or second predetermined time T1 or T2), has elapsed after the start of the pivot of the active lever 24 (S1). Then, when the completion of the release movement is determined on the basis of the above-mentioned condition, the process shifts to the returning from release range movement, and the returning from release range movement starts to be performed until completion (S2).

Subsequently, whether or not the returning from release range movement is normally completed is determined on the basis of the detection signal NPRsw where the switching of the signal from ON to OFF is detected (S3). When the completion of the returning from release range movement is determined on the basis of the above-mentioned condition, the performance of the second neutral position detecting switch 35 is determined to be normal, and the release-side abnormal count CNPR is cleared (S4). On the other hand, when the completion of the returning from release range movement is not determined on the basis of the above-mentioned condition, the performance of the second neutral position detecting switch 35 is determined to be abnormal, and the release-side abnormal count CNPR is increased by one (S4).

On the other hand, in a case where the release movement is determined not to be completed on the basis of the above-mentioned condition in S1, it is determined whether or not the detection signal NPCsw is ON and whether or not the detection signal NPRsw is OFF at the time of the completion of the close movement. In other words, whether or not the active lever 24 is in the close range is determined (S6). When the active lever 24 is determined to be in the close range after the completion of the close movement, the process shifts to the returning from close range movement, and the returning from close range movement starts to be performed until completion (S7).

Subsequently, whether or not the returning from close range movement is normally completed is determined on the basis of the detection signal NPCsw, where the switching of the signal from ON to OFF is detected (S8). When the completion of the returning from close range movement is determined on the basis of the above-mentioned condition, the performance of the first neutral position detecting switch 34 is determined to be normal, and the close-side abnormal count CNPC is cleared (S9). On the other hand, when the completion of the returning from close range movement is not determined on the basis of the above-mentioned condition, the performance of the first neutral position detecting switch 34 is determined to be abnormal, and the close-side abnormal count CNPC is increased by one (S10).

Further, when the active lever 24 is not determined to be in the close range at the time of completion of the close movement in S6, the first neutral position detecting switch 34 is determined to be abnormal. Then, the process shifts to the stress relaxing movement, and the stress relaxing movement starts to be performed until completion (S11). Then, the close-side abnormal count is increased by one (S12).

After the close-side abnormal count CNPC and the release-side abnormal count CNPR are updated in any one of S4, S5, S9, S10 and S12, it is determined whether or not a current sum of the value of the close-side abnormal count CNPC and the value of the release-side abnormal count CNPR (=CNPC+CNPR) (i.e., the abnormal count CN) is equal to or larger than the predetermined number of times CNth (S13). When the abnormal count CN is equal to or larger than the predetermined number of times CNth, the performance of the first or second neutral position detecting switch 34 or 35 is determined to be abnormal (S14). When the abnormal count CN is less than the predetermined number of times CNth, the performance of the first or second neutral position detecting switch 34 or 35 is determined to be normal, and the following movement continues to be allowed (S15).

A controlling manner of the drive of the door lock device 10 in response to the above-described determination of the abnormal performance and the like of the first or second neutral position detecting switch 34 or 35 will be described hereinafter. As illustrated in FIG. 10, when the routine shown in FIG. 10 is started during the process, the close movement is started and the slide door 2 starts to be pulled by means of the latch mechanism 12 (the latch 13) (S21), until completion of the pulling of the slide door 2 by means of the latch mechanism 12 (S22). Subsequently, it is determined whether or not the detection signal NPCsw is ON and whether or not the detection signal NPRsw is OFF at the time of the completion of the close movement. In other words, whether or not the active lever 24 is in the close range is determined (S23, corresponding to S6). When the active lever 24 is determined to be in the close range after the completion of the close movement, the process shifts to the returning from close range movement, and the returning from close range movement starts to be performed until completion (S24, corresponding to S7).

Subsequently, it is determined whether or not the request for the opening movement of the slide door 2 is outputted in response to the operation of the open switch 42 (S25). An ECU flag F remains to be in a current state until it is determined that the request for the opening movement is outputted. The ECU flag F is set to be OFF when a normal timer (the first predetermined time T1) is used in the release movement, while being set to be ON when a longer timer (the second predetermined time T2) is used in the release movement. The door ECU 40 memorizes the movement (the returning from close range movement or the stress relaxing movement), which is performed after the completion of the close movement, as the ECU flag F in the memory 40*a*. Then, when it is determined that the request for the opening movement of the slide door 2 is outputted in response to the operation of the open switch 42 (S25), the release movement starts to be performed until completion (S27). At that time, the ECU flag F is OFF. Therefore, a usage of the first predetermined time T1 is determined after the completion of the release movement is determined. Subsequently, as described above, the returning from release range movement starts to be performed until completion after the completion of the release movement, and then the door driving unit 50 is controlled to be driven so as to perform the opening movement of the slide door 2.

On the other hand, in a case where the active lever 24 is not determined to be in the close range at the time of completion of the close movement, the process shifts to the stress relaxing movement, and the stress relaxing movement starts to be performed until completion (S28, corresponding to S11). Then, it is determined whether or not the performance of the first or second neutral position detecting switch 34 or 35 is abnormal (S29, corresponding to S14). When the performance of the first or second neutral position detecting switch 34 or 35 is determined not to be abnormal, the ECU flag F is set to be ON (S31). Further, when the power is re-supplied to the door ECU 40 and the data in the memory 40*a* is reset (S30), the ECU flag F is set to be ON.

Subsequently, it is determined whether or not the request for the opening movement of the slide door 2 is outputted in response to the operation of the open switch 42 (S32). The ECU flag F remains to be in a current state until it is determined that the request for the opening movement is outputted (S33). Then, when it is determined that the request for the opening movement of the slide door 2 is outputted in response to the operation of the open switch 42, the release movement starts to be performed until completion (S34). At that time, the ECU flag F is ON. Therefore, a usage of the second predetermined time T2 is determined after the completion of the release movement is determined. Subsequently, after the completion of the release movement, the returning from release range movement and the like is performed similarly to S27. Then, the ECU flag F is reset (S35).

Further, when it is determined that the performance of the first or second neutral position detecting switch 34 or 35 is abnormal in S29, a driving prohibiting process for prohibiting the driving of the active lever 24 is performed (S36), and even when the operational signal for requesting the opening movement of the slide door 2 is outputted from the open switch 42, the door ECU 40 does not follow the request, and the active lever 24 becomes forcibly stopped state.

According to the embodiment, the following effects may be obtained.

According to the embodiment, in a case where the abnormal count CN is less than the predetermined number of times CNth, the release movement and the like is allowed even after the stress relaxing movement, and thus the forcible stop is canceled. In such a case, when the slide door 2 is held in the fully-closed state (or the half-closed state) by means of the latch mechanism 12, the release movement is allowed in response to the detecting of the signal for requesting the movement (the opening movement) of the slide door 2, thereby allowing the opening movement of the slide door 2. Accordingly, even when it is not detected that the active lever 24 is in the first and second neutral positions, the opening movement of the slide door 2 may be continued under a predetermined condition. As a result, the opening operation of the slide door 2 may become more convenient. On the other hand, in a case where the abnormal count CN is equal to or more than the predetermined number of times CNth, further movement is forcibly stopped after the stress relaxing movement. Therefore, it may be possible to restrict a significant deterioration of the accuracy of the movement of the latch mechanism 12 due to an accumulation of a positional error of the active lever 24.

Similarly, when the slide door 2 is held in the fully-opened state by means of the latch mechanism of the full-opening lock 7, the closing operation of the slide door 2 may become more convenient.

According to the embodiment, in a case where the latch mechanism 12 is not accidentally detected to be in the unlatched state after the active lever 24, which has been in the neutral position (the first neutral position), is driven in response to the signal for requesting the movement (the opening movement) of the slide door 2, the release movement is completed on the basis of the elapsing of the first predetermined time T1 after the start of the driving of the active lever 24. Further, in a case where the latch mechanism 12 is not accidentally detected to be in the unlatched state after the active lever 24, which has been in the pivot position after the stress relaxing movement, is driven in response to the signal for requesting the movement (the opening movement) of the slide door 2, the release movement is completed on the basis of the elapsing of the second predetermined time T2 after the start of the driving of the active lever 24. Accordingly, in a state where the slide door 2 is held in the fully-closed state or in the half-closed state, the slide door 2 may be more surely moved (the opening movement may be more surely performed).

Similarly, when the slide door 2 is held in the fully-opened state by means of the latch mechanism of the full-opening lock 7, the slide door 2 may be more surely moved (the closing movement may be more surely performed).

According to the embodiment, when the power is re-supplied to the door ECU 40, the memory 40*a* is reset. Therefore, a current position of the active lever 24 becomes unknown. However, when the power is re-supplied to the door ECU 40, or when the latch mechanism 12 is not accidentally detected to be in the unlatched state after the active lever 24 is driven in response to the signal for requesting the movement (the opening movement) of the slide door 2, the release movement is completed on the basis of the elapsing of the second predetermined time T2 after the start of the driving of the active lever 24. Accordingly, in a state where the slide door 2 is held in the fully-closed state or in the half-closed state, even when the active lever 24 is in the pivot position after the stress relaxing movement, the slide door 2 may be more surely moved (the opening movement may be more surely performed).

Similarly, when the slide door 2 is held in the fully-opened state by means of the latch mechanism of the full-opening lock 7, the slide door 2 may be more surely moved (the closing movement may be more surely performed).

According to the embodiment, the neutral position (the first and the second neutral positions) of the active lever 24 is detected by means of the first and second neutral position detecting switches 34 and 35. Therefore, even when one of the first and second neutral position detecting switches 34 and 35 malfunctions, the active lever 24 may be maintained to be in the neutral position (the neutral range). Accordingly, an interference between the latch mechanism 12 and the active lever 24 and the like may be restricted.

According to the embodiment, even when the abnormal performance of the first and second neutral position detecting switches 34 and 35 is temporarily determined, as long as the abnormal count CN remains to be less than the predetermined number of times CNth, the determination of the abnormal performance is canceled in response to a subsequent determination of the normal performance. Therefore, unnecessary determination of the abnormal performance of the first and second neutral position detecting switches 34 and 35 (i.e., the forcible stopping) may be restricted.

According to the embodiment, when the opening and closing movement of the slide door 2 is performed after the stress relaxing movement, a mechanical interference may be restricted. On the other hand, when the opening and closing movement of the slide door 2 is performed after the returning from close range movement, the active lever 24 is pivoted from the neutral position. Therefore, the opening and closing movement of the slide door 2 may be surely performed.

The above-described embodiment may be modified as follows.

According to the embodiment, the abnormal performance of the first and second neutral position detecting switches 34 and 35 is not determined when the abnormal count CN is less than the predetermined number of times CNth. While the abnormal count CN is being increased, a warning may be outputted from a warning means (for example, a warning light) so as to warn the user.

According to the embodiment, the abnormal performance of the first and second neutral position detecting switches 34 and 35 is determined when the abnormal count CN becomes equal to or larger than the predetermined number of times CNth. Alternatively, the abnormal performance of the first and second neutral position detecting switches 34 and 35 may be determined when one of the close-side abnormal count CNPC and the release-side abnormal count CNPR becomes equal to or larger than the predetermined plural number of times.

Only one neutral position may be set, and only one neutral position detecting switch may be provided to detect the neutral position. In such a case, the abnormal performance of the neutral position detecting switch may be determined and the movement of the active lever 24 may be forcibly stopped on the basis of the number of times of continuous failures in detecting the neutral position or the number of times of failures in detecting the neutral position within a predetermined time.

According to the embodiment, both of a full-closing-side door lock and a full-opening-side door lock (i.e., the door lock device 10 and the full-opening lock 7) performs the close movement. However, only one of the full-closing-side door lock and the full-opening-side door lock may perform the close movement. Generally, only the full-closing-side door lock may perform the close movement.

In a case where only one of the full-closing-side door lock and the full-opening-side door lock performs the close movement, the above-described embodiment may be applied to of the door locks for both of the opening and closing movement control of the slide door 2. In other words, in a case where only the full-closing-side door lock device 10 performs the close movement, the latch mechanism of the full-opening lock 7 may be engaged with the vehicle body 1 (the rear end portion of the opening portion 1*a*), using impetus of the opening movement of the slide door 2, thereby the full-opening lock 7 may be switched to the fully-latched state. Consequently, the slide door 2 is held by means of the full-opening lock 7 in the fully-opened state. Further, similarly to the above-described embodiment, the latch mechanism of the full-opening lock 7 is released from the fully-latched state by means of the releasing-movement of the active lever 24, which is interlocked with the door lock device 10. The latch mechanism 12 (the pawl 14) of the door lock device 10 is mechanically connected to the outside grip 3. Therefore, the latch mechanism 12 may be manually releasable.

In a state where the active lever 24 is being stopped after the stress relaxing movement is performed subsequently to the closing movement of the slide door 2, and then, the latch mechanism 12 of the door lock device 10 is released so as to perform the opening movement of the slide door 2 (so as to operate the slide door 2 to be opened), the slide door 2 is held in the fully-opened state by means of the full-opening lock 7 (the latch mechanism thereof). At that time, a position of the active lever 24 is not changed. Therefore, the active lever 24 remains to be stopped at the position after the stress relaxing movement. Subsequently, when the request for the closing movement of the slide door 2 is detected in response to the operation of the close switch 41, the active lever 24 is driven so as to perform the release movement. Consequently, the full-opening lock 7 is released. Thus, in a case where only the full-closing-side door lock device 10 performs the close movement, the embodiment may be applied to the door lock device 10, which is interlocked with the full-opening lock 7, not only for the opening movement control but for the closing movement control.

A swing door, a back door, a trunk lid and the like may serve as the opening-and-closing member. Further, a driving mechanism for mechanically interlocking the opening-and-closing member and a motor may be selectively applied. For example, a link mechanism, a cam mechanism, a gear mechanism, a cable transmitting mechanism (a rope, or a belt), a screw mechanism and the like, or a combination thereof, may be applied.

According to the embodiment, the predetermined number of times CNth is set as a maximum allowable number of times of continuous detection failures where the first and second neutral position detecting switches 34 and 35 do not detect that the active lever 24 is in the neutral position, or as a maximum allowable accumulated number of times of detection failures within a predetermined time where the first and second neutral position detecting switches 34 and 35 do not detect that the active lever 24 is in the neutral position.

Accordingly, in a case where a number of times of the detection failures where it is impossible to detect that the active lever 24 is in the neutral position, is less than the predetermined number of times CNth, the prohibition of the driving of the active lever 24 by means of the prohibiting portion after the reverse driving (the stress relaxing movement) by means of the stress relaxing portion is canceled by means of the canceling portion. In such a case, when the slide door 2 is held in the fully-closed state by means of the latch mechanism 12, the release movement is allowed in response to the detecting of the signal for requesting the movement (the opening movement) of the slide door 2. Therefore, the slide door 2 is allowed to be opened. Accordingly, even when there is a detection failure, the movement (the opening movement) of the slide door 2 may be continued under a predetermined condition. As a result, the operation (the opening operation) of the slide door 2 may become more convenient. On the other hand, in a case where a number of times of the detection failures become equal to or larger than the predetermined number of times CNth, the driving of the active lever 24 is prohibited by means of the prohibiting portion. Therefore, it may be possible to restrict a significant deterioration of the accuracy of the movement of the latch mechanism 12 due to an accumulation of a positional error of the active lever 24.

According to the embodiment, the apparatus for controlling the opening-and-closing member 2 for the vehicle further includes: the half-latch switch 31 and the full-latch switch 32 for detecting the unlatched state where the latch mechanism 12 releases the holding of the slide door 2. In a case where the active lever 24 is in the neutral position, the door ECU 40 completes the release movement when the half-latch switch 31 and the full-latch switch 32 detect that the latch mechanism 12 is in the unlatched state after the active lever 24 is driven in response to the detection of the request for the movement of the slide door 2, or when a time, being longer than a first predetermined time T1, within which the release movement is estimated to be completed, has elapsed after the driving of the active lever 24 has started. In a state where the active lever 24 is in a position after the driving of the active lever 24 in the reverse direction by means of the stress relaxing portion 40, the door ECU 40 completes the release movement when the half-latch switch 31 and the full-latch switch 32 detect that the latch mechanism 12 is in the unlatched state after the active lever 24 is driven in response to the detection of the request for the movement of the slide door 2, or when a time, being longer than a second predetermined time T2, which is set to be longer than the first predetermined time T1, has elapsed after the driving of the active lever 24 has started.

Accordingly, the door ECU 40 completes the release movement when it is detected that the latch mechanism 12 is in the unlatched state by means of the half-latch switch 31 and the full-latch switch 32 after the active lever 24 is driven in response to the detection of the signal for requesting the movement of the slide door 2. On the other hand, in a case where the latch mechanism 12 is not detected to be in the unlatched state after the active lever 24, which has been in the neutral position, is driven in response to the signal for requesting the movement of the slide door 2, the door ECU 40 completes the release movement on the basis of the elapsing of the first predetermined time T1 after the start of the driving of the slide door 2. Further, in a case where the latch mechanism 12 is not detected to be in the unlatched state after the active lever 24, which has been in the pivot position after the reverse driving by means of the stress relaxing portion, is driven in response to the signal for requesting the movement of the slide door 2, the controlling portion completes the release movement on the basis of the elapsing of the second predetermined time T2, which is set to be longer than the first predetermined time T1, after the start of the driving of the active lever 24. Normally, in a case where the active lever 24 is in the pivot position after the reverse driving by means of the stress relaxing portion, the time elapsing after the active lever 24 starts to be driven until the completion of the release movement is longer, compared to a case where the active lever 24 is in the neutral position. In a case where the active lever 24 is in the pivot position after the reverse driving by means of the stress relaxing portion, the controlling portion does not complete the release movement until the second predetermined time T2 elapses after the active lever 24 starts to be driven. As a result, the slide door 2 becomes movable more surely.

According to the embodiment, the door ECU 40 includes a memory **40*a* for memorizing whether the active lever 24 is in the neutral position or in the position after the driving of the active lever 24 in the reverse direction by means of the stress relaxing portion 40, the memory 40*a* being reset when a power supply to the door ECU 40 is stopped. In a case where the power is re-supplied to the door ECU 40, the door ECU 40 completes the release movement when the half-latch switch 31 and the full-latch switch 32 detect that the latch mechanism 2 is in the unlatched state in response to the detection of the request for the movement of the slide door 2, or when a time, being longer than a second predetermined time T2, has elapsed after the driving of the active lever 24** has started.

Accordingly, when the power is re-supplied to the controlling portion, the position of the active lever 24 (the neutral position or the position after the revere driving by means of the stress relaxing portion 40), memorized in the memory 40*a* is reset. Therefore, a current position of the active lever 24 becomes unknown when the power is re-supplied to the controlling portion. However, when the power is re-supplied to the door ECU 40, the door ECU 40 does not complete the release movement until the second predetermined time T2 elapses after the start of the driving of the active lever 24. Accordingly, even when the active lever 24 is in the pivot position after the stress relaxing movement by means of the stress relaxing portion, the slide door 2 may be more surely moved.

According to the embodiment, the apparatus for controlling the opening-and-closing member 2 for the vehicle further includes the half-latch switch 31 and the full-latch switch 32 for detecting a state of the latch mechanism 12, the close witch 41 and the open switch 42 for detecting the request for the opening movement or the closing movement of the slide door 2. The latch mechanism 12 is configured to be switched to the fully-latched state for holding slide door 2, the half-latched state for half-holding the slide door 2, and the unlatched state for releasing the slide door 2. When the active lever 24 is switched from unlatched state to the half-latched state according to the closing movement or the opening movement of the slide door 2, the door ECU 40 executes the driving of the first DC motor 11 so as to drive the active lever 24 in one direction from the neutral position in order to switch the latch mechanism 12 from the half-latched state to the fully-latched state. When the request for the opening movement or the closing movement of the slide door 2 is detected, the door ECU 40 executes the driving of the first DC motor 11 so as to drive the active lever 24 in the other direction from the neutral position in order to switch the latch mechanism 12 from the fully-latched state or the half-latched state to the unlatched state. After the active lever 24 is switched to the fully-latched state or the unlatched state the door ECU 40 executes the driving of the first DC motor 11 so as to return the active lever 24 to the neutral position. In a case of a detection failure where the first and second neutral position detecting switches 34 and 35 do not detect that the active lever 24 is in the neutral position, the stress relaxing portion 40 executes a stress relaxing movement for the latch mechanism 12 and the active lever 24, in which the first DC motor 11 is driven in the reverse direction so as to pivot the active lever 24 toward the neutral position for a predetermined time or by a predetermined amount after the latch mechanism 12 is switched from half-latched state to the fully-latched state. After the stress relaxing movement by means of the stress relaxing portion 40, the prohibiting portion 40 prohibiting the driving of the first DC motor 11 in response to the detection of the request for the movement of the slide door 2. In a case where the number of times of the detection failures is less than the predetermined plural number of times, the cancelling portion 40 cancelling the prohibition of the driving of the first DC motor 11 by means of the prohibiting portion 40 and switching the latch mechanism 12 from fully-latched state or the half-latched state to the unlatched state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for controlling an opening-and-closing member for a vehicle comprising:

a latch mechanism;

a driving lever configured to be interlocked with the latch mechanism;

a neutral position detecting element detecting that the driving lever is in a predetermined neutral position for releasing the latch mechanism; and a controller performing a close movement, in which the driving lever is driven in one direction from the neutral position so as to hold the opening-and-closing member by means of the latch mechanism, a release movement, in which the driving lever is driven in an opposite direction from the neutral position in response to a detection of a request for a movement of the opening-and-closing member so as to release the holding of the opening-and-closing member by means of the latch mechanism, and a returning movement, in which the driving lever is driven toward the neutral position so as to return the driving lever to the neutral position after the close movement or the release movement, the controller including:

a stress relaxing portion executing a driving of the driving lever in the opposite direction toward the neutral position for a predetermined time or by a predetermined distance after the close movement, in a case of a detection failure where the neutral position detecting element does not detect that the driving lever is in the neutral position, a prohibiting portion executing a prohibition of the driving of the driving lever after the driving of the driving lever in the opposite direction by means of the stress relaxing portion, in response to the detection of the request for the movement of the opening-and-closing member, and a cancelling portion cancelling the prohibition of the driving of the driving lever by means of the prohibiting portion in a case where the number of times of the detection failures is less than a predetermined plural number of times.

2. The apparatus for controlling the opening-and-closing member for the vehicle according to claim 1, wherein the predetermined plural number of times is set to be the number of times of continuous detection failures where the neutral position detecting element does not detect that the driving lever is in the neutral position, or the accumulated number of times of detection failures within a predetermined time where the neutral position detecting element does not detect that the driving lever is in the neutral position.

3. The apparatus for controlling the opening-and-closing member for the vehicle according to claim 2 further including:

a latch detecting element for detecting an unlatched state where the latch mechanism does not hold the opening-and-closing member, wherein in a case where the driving lever is in the neutral position, the controller completes the release movement when the latch detecting portion detects that the latch mechanism is in the unlatched state after the driving lever is driven in response to the detection of the request for the movement of the opening-and-closing member, or when a time, being longer than a first predetermined time, within which the release movement is estimated to be completed, has elapsed after the driving of the driving lever has started, and wherein in a state where the driving lever is in a position after the driving of the driving lever in the opposite direction by means of the stress relaxing portion, the controller completes the release movement when the latch detecting portion detects that the latch mechanism is in the unlatched state after the driving lever is driven in response to the detection of the request for the movement of the opening-and-closing member, or when a time, being longer than a second predetermined time, which is set to be longer than the first predetermined time, has elapsed after the driving of the driving lever has started.

4. The apparatus for controlling the opening-and-closing member for the vehicle according to claim 3, wherein the controller includes a memorizing portion for memorizing whether the driving lever is in the neutral position or in the position after the driving of the driving lever in the opposite direction by means of the stress relaxing portion, the memorizing portion being reset when a power supply to the controller is stopped so that the memorizing portion does not memorize a position of the driving lever, and wherein in a case where the power is re-supplied to the controller, the controller completes the release movement when the latch detecting portion detects that the latch mechanism is in the unlatched state in response to the detection of the request for the movement of the opening-and-closing member, or when a time, being longer than a second predetermined time, has elapsed after the driving of the driving lever has started.

5. The apparatus for controlling the opening-and-closing member for the vehicle according to claim 4 further including a latch detecting element for detecting a state of the latch mechanism, an element for detecting the request for an opening movement or a closing movement of a vehicle door, wherein the latch mechanism is configured to be switched to a fully-latched state for holding vehicle door, a half-latched state for partially holding the vehicle door, and the unlatched state for releasing the vehicle door, when the driving lever is switched from unlatched state to the half-latched state according to the closing movement or the opening movement of the vehicle door, the controller executes a driving of a power source so as to drive the driving lever in the one direction from the neutral position in order to switch the latch mechanism from the half-latched state to the fully-latched state, when the request for the opening movement or the closing movement of the vehicle door is detected, the controller executes the driving of a power source so as to drive the driving lever in the opposite direction from the neutral position in order to switch the latch mechanism from the fully-latched state or the half-latched state to the unlatched state, after the driving lever is switched to the fully-latched state or the unlatched state the controller executes the driving of the power source so as to return the driving lever to the neutral position, in a case of a detection failure where the neutral position detecting element does not detect that the driving lever is in the neutral position, the stress relaxing portion executes a stress relaxing movement for the latch mechanism and the driving lever, in which the power source is driven in the opposite direction so as to pivot the driving lever toward the neutral position for a predetermined time or by a predetermined distance after the latch mechanism is switched from half-latched state to the fully-latched state, after the stress relaxing movement by means of the stress relaxing portion, the prohibiting portion prohibiting the driving of the power source in response to the detection of the request for the movement of the vehicle door, and wherein in a case where the number of times of the detection failures is less than the predetermined plural number of times, the cancelling portion cancelling the prohibition of the driving of the power source by means of the prohibiting portion and switching the latch mechanism from fully-latched state or the half-latched state to the unlatched state.

6. The apparatus for controlling the opening-and-closing member for the vehicle according to claim 2 further including a latch detecting element for detecting a state of the latch mechanism, an element for detecting the request for an opening movement or a closing movement of a vehicle door, wherein the latch mechanism is configured to be switched to a fully-latched state for holding vehicle door, a half-latched state for partially holding the vehicle door, and the unlatched state for releasing the vehicle door, when the driving lever is switched from unlatched state to the half-latched state according to the closing movement or the opening movement of the vehicle door, the controller executes a driving of a power source so as to drive the driving lever in the one direction from the neutral position in order to switch the latch mechanism from the half-latched state to the fully-latched state, when the request for the opening movement or the closing movement of the vehicle door is detected, the controller executes the driving of a power source so as to drive the driving lever in the opposite direction from the neutral position in order to switch the latch mechanism from the fully-latched state or the half-latched state to the unlatched state, after the driving lever is switched to the fully-latched state or the unlatched state the controller executes the driving of the power source so as to return the driving lever to the neutral position, in a case of a detection failure where the neutral position detecting element does not detect that the driving lever is in the neutral position, the stress relaxing portion executes a stress relaxing movement for the latch mechanism and the driving lever, in which the power source is driven in the opposite direction so as to pivot the driving lever toward the neutral position for a predetermined time or by a predetermined distance after the latch mechanism is switched from half-latched state to the fully-latched state, after the stress relaxing movement by means of the stress relaxing portion, the prohibiting portion prohibiting the driving of the power source in response to the detection of the request for the movement of the vehicle door, and wherein in a case where the number of times of the detection failures is less than the predetermined plural number of times, the cancelling portion cancelling the prohibition of the driving of the power source by means of the prohibiting portion and switching the latch mechanism from fully-latched state or the half-latched state to the unlatched state.

7. The apparatus for controlling the opening-and-closing member for the vehicle according to claim 3 further including a latch detecting element for detecting a state of the latch mechanism, an element for detecting the request for an opening movement or a closing movement of a vehicle door, wherein the latch mechanism is configured to be switched to a fully-latched state for holding vehicle door, a half-latched state for partially holding the vehicle door, and the unlatched state for releasing the vehicle door, when the driving lever is switched from unlatched state to the half-latched state according to the closing movement or the opening movement of the vehicle door, the controller executes a driving of a power source so as to drive the driving lever in the one direction from the neutral position in order to switch the latch mechanism from the half-latched state to the fully-latched state, when the request for the opening movement or the closing movement of the vehicle door is detected, the controller executes the driving of a power source so as to drive the driving lever in the opposite direction from the neutral position in order to switch the latch mechanism from the fully-latched state or the half-latched state to the unlatched state, after the driving lever is switched to the fully-latched state or the unlatched state the controller executes the driving of the power source so as to return the driving lever to the neutral position, in a case of a detection failure where the neutral position detecting element does not detect that the driving lever is in the neutral position, the stress relaxing portion executes a stress relaxing movement for the latch mechanism and the driving lever, in which the power source is driven in the opposite direction so as to pivot the driving lever toward the neutral position for a predetermined time or by a predetermined distance after the latch mechanism is switched from half-latched state to the fully-latched state, after the stress relaxing movement by means of the stress relaxing portion, the prohibiting portion prohibiting the driving of the power source in response to the detection of the request for the movement of the vehicle door, and wherein in a case where the number of times of the detection failures is less than the predetermined plural number of times, the cancelling portion cancelling the prohibition of the driving of the power source by means of the prohibiting portion and switching the latch mechanism from fully-latched state or the half-latched state to the unlatched state.

8. The apparatus for controlling the opening-and-closing member for the vehicle according to claim 1 further including:

a latch detecting element for detecting an unlatched state where the latch mechanism does not hold the opening-and-closing member, wherein in a case where the driving lever is in the neutral position, the controller completes the release movement when the latch detecting portion detects that the latch mechanism is in the unlatched state after the driving lever is driven in response to the detection of the request for the movement of the opening-and-closing member, or when a time, being longer than a first predetermined time, within which the release movement is estimated to be completed, has elapsed after the driving of the driving lever has started, and wherein in a state where the driving lever is in a position after the driving of the driving lever in the opposite direction by means of the stress relaxing portion, the controller completes the release movement when the latch detecting portion detects that the latch mechanism is in the unlatched state after the driving lever is driven in response to the detection of the request for the movement of the opening-and-closing member, or when a time, being longer than a second predetermined time, which is set to be longer than the first predetermined time, has elapsed after the driving of the driving lever has started.

9. The apparatus for controlling the opening-and-closing member for the vehicle according to claim 8, wherein the controller includes a memorizing portion for memorizing whether the driving lever is in the neutral position or in the position after the driving of the driving lever in the opposite direction by means of the stress relaxing portion, the memorizing portion being reset when a power supply to the controller is stopped so that the memorizing portion does not memorize a position of the driving lever, and wherein in a case where the power is re-supplied to the controller, the controller completes the release movement when the latch detecting portion detects that the latch mechanism is in the unlatched state in response to the detection of the request for the movement of the opening-and-closing member, or when a time, being longer than a second predetermined time, has elapsed after the driving of the driving lever has started.

10. The apparatus for controlling the opening-and-closing member for the vehicle according to claim 9 further including a latch detecting element for detecting a state of the latch mechanism, an element for detecting the request for an opening movement or a closing movement of a vehicle door, wherein the latch mechanism is configured to be switched to a fully-latched state for holding vehicle door, a half-latched state for partially holding the vehicle door, and the unlatched state for releasing the vehicle door, when the driving lever is switched from unlatched state to the half-latched state according to the closing movement or the opening movement of the vehicle door, the controller executes a driving of a power source so as to drive the driving lever in the one direction from the neutral position in order to switch the latch mechanism from the half-latched state to the fully-latched state, when the request for the opening movement or the closing movement of the vehicle door is detected, the controller executes the driving of a power source so as to drive the driving lever in the opposite direction from the neutral position in order to switch the latch mechanism from the fully-latched state or the half-latched state to the unlatched state, after the driving lever is switched to the fully-latched state or the unlatched state the controller executes the driving of the power source so as to return the driving lever to the neutral position, in a case of a detection failure where the neutral position detecting element does not detect that the driving lever is in the neutral position, the stress relaxing portion executes a stress relaxing movement for the latch mechanism and the driving lever, in which the power source is driven in the opposite direction so as to pivot the driving lever toward the neutral position for a predetermined time or by a predetermined distance after the latch mechanism is switched from half-latched state to the fully-latched state, after the stress relaxing movement by means of the stress relaxing portion, the prohibiting portion prohibiting the driving of the power source in response to the detection of the request for the movement of the vehicle door, and wherein in a case where the number of times of the detection failures is less than the predetermined plural number of times, the cancelling portion cancelling the prohibition of the driving of the power source by means of the prohibiting portion and switching the latch mechanism from fully-latched state or the half-latched state to the unlatched state.

11. The apparatus for controlling the opening-and-closing member for the vehicle according to claim 8 further including an element for detecting the request for an opening movement or a closing movement of a vehicle door, wherein the latch mechanism is configured to be switched to a fully-latched state for holding vehicle door, a half-latched state for partially holding the vehicle door, and the unlatched state for releasing the vehicle door, when the driving lever is switched from unlatched state to the half-latched state according to the closing movement or the opening movement of the vehicle door, the controller executes a driving of a power source so as to drive the driving lever in the one direction from the neutral position in order to switch the latch mechanism from the half-latched state to the fully-latched state, when the request for the opening movement or the closing movement of the vehicle door is detected, the controller executes the driving of a power source so as to drive the driving lever in the opposite direction from the neutral position in order to switch the latch mechanism from the fully-latched state or the half-latched state to the unlatched state, after the driving lever is switched to the fully-latched state or the unlatched state the controller executes the driving of the power source so as to return the driving lever to the neutral position, in a case of a detection failure where the neutral position detecting element does not detect that the driving lever is in the neutral position, the stress relaxing portion executes a stress relaxing movement for the latch mechanism and the driving lever, in which the power source is driven in the opposite direction so as to pivot the driving lever toward the neutral position for a predetermined time or by a predetermined distance after the latch mechanism is switched from half-latched state to the fully-latched state, after the stress relaxing movement by means of the stress relaxing portion, the prohibiting portion prohibiting the driving of the power source in response to the detection of the request for the movement of the vehicle door, and wherein in a case where the number of times of the detection failures is less than the predetermined plural number of times, the cancelling portion cancelling the prohibition of the driving of the power source by means of the prohibiting portion and switching the latch mechanism from fully-latched state or the half-latched state to the unlatched state.

12. The apparatus for controlling the opening-and-closing member for the vehicle according to claim 1 further including a latch detecting element for detecting a state of the latch mechanism, an element for detecting the request for an opening movement or a closing movement of a vehicle door, wherein the latch mechanism is configured to be switched to a fully-latched state for holding vehicle door, a half-latched state for partially holding the vehicle door, and the unlatched state for releasing the vehicle door, when the driving lever is switched from unlatched state to the half-latched state according to the closing movement or the opening movement of the vehicle door, the controller executes a driving of a power source so as to drive the driving lever in the one direction from the neutral position in order to switch the latch mechanism from the half-latched state to the fully-latched state, when the request for the opening movement or the closing movement of the vehicle door is detected, the controller executes the driving of a power source so as to drive the driving lever in the opposite direction from the neutral position in order to switch the latch mechanism from the fully-latched state or the half-latched state to the unlatched state, after the driving lever is switched to the fully-latched state or the unlatched state the controller executes the driving of the power source so as to return the driving lever to the neutral position, in a case of a detection failure where the neutral position detecting element does not detect that the driving lever is in the neutral position, the stress relaxing portion executes a stress relaxing movement for the latch mechanism and the driving lever, in which the power source is driven in the opposite direction so as to pivot the driving lever toward the neutral position for a predetermined time or by a predetermined distance after the latch mechanism is switched from half-latched state to the fully-latched state, after the stress relaxing movement by means of the stress relaxing portion, the prohibiting portion prohibiting the driving of the power source in response to the detection of the request for the movement of the vehicle door, and wherein in a case where the number of times of the detection failures is less than the predetermined plural number of times, the cancelling portion cancelling the prohibition of the driving of the power source by means of the prohibiting portion and switching the latch mechanism from fully-latched state or the half-latched state to the unlatched state.

13. The apparatus for controlling the opening-and-closing member for the vehicle comprising:

a latch mechanism configured to be switched to a fully-latched state for holding the vehicle door, a half-latched state for partially holding the vehicle door, and an unlatched state for releasing the vehicle door;

a driving lever configured to be interlocked with the latch mechanism, and driven by a power source to pivot;

a neutral position detecting element detecting that the driving lever is in a predetermined neutral position where the interlocking between the latch mechanism and the driving lever is released;

a latch detecting element detecting a state of the latch mechanism;

an element for detecting a request for an opening movement or a closing movement of the vehicle door, and a controller executing a driving of the power source so as to drive the driving lever in one direction from the neutral position in order to switch the latch mechanism from the half-latched state to the fully-latched state, after the driving lever is switched from the unlatched state to the half-latched state according to the closing movement or the opening movement of the vehicle door, wherein when the request for the opening movement or the closing movement of the vehicle door is detected, the controller executes the driving of the power source so as to drive the driving lever in an opposite direction from the neutral position in order to switch the latch mechanism from the fully-latched state or the half-latched state to the unlatched state, after the driving lever is switched to the fully-latched state or the unlatched state, the controller executes the driving of the power source so as to return the driving lever to the neutral position, in a case of a detection failure where the neutral position detecting element does not detect that the driving lever is in the neutral position, a stress relaxing portion of the controller executes a stress relaxing movement for the latch mechanism and the driving lever, in which the power source is driven in the opposite direction so as to pivot the driving lever toward the neutral position for a predetermined time or by a predetermined distance after the latch mechanism is switched from the half-latched state to the fully-latched state, after the stress relaxing movement by means of the stress relaxing portion, a prohibiting portion of the controller prohibits the driving of the power source in response to the detection of the request for the opening movement or the closing movement of the vehicle door, and wherein in a case where the number of times of the detection failures is less than the predetermined plural number of times, a cancelling portion of the controller cancels the prohibition of the driving of the power source by means of the prohibiting portion and switches the latch mechanism from the fully-latched state or the half-latched state to the unlatched state.

14. An apparatus for controlling an opening-and-closing member of a vehicle, the apparatus comprising:

a latch engageable with the opening-and-closing member;

a gear configured to rotate in one direction from a neutral position to a closed position and move the latch while rotating in the one direction, and rotate in an opposite direction from the neutral position to an open position and move the latch while rotating in the opposite direction;

a neutral position detecting switch configured to detect the gear in the neutral position; and a controller configured to:

instruct a closing movement in which the gear rotates in the one direction from the neutral position to the closed position and moves the latch to engage the opening-and-closing member, instruct a release movement in which the gear rotates in the opposite direction from the neutral position to the open position and moves the latch to release the opening-and-closing member, instruct a return movement in which the gear rotates back to the neutral position after the closing movement or the release movement, instruct a stress relaxing movement in which the gear rotates in the opposite direction for a predetermined time or by a predetermined amount after the closing movement when the neutral position detecting switch fails to detect the gear in the neutral position, and prevent rotation of the gear after the stress relaxing movement when a number of times the neutral position detecting switch has failed to detect the gear in the neutral position exceeds a predetermined number.

* * * * *